United States Patent
Felbinger et al.

(10) Patent No.: US 10,878,483 B1
(45) Date of Patent: Dec. 29, 2020

(54) METHOD, SYSTEM, AND MEDIUM FOR ASSET-BASED PERMISSIONS MANAGEMENT FOR RESELLERS OF CLOUD EXCHANGE ASSETS

(71) Applicant: Equinix, Inc., Redwood City, CA (US)

(72) Inventors: Kirk Allan Felbinger, San Jose, CA (US); Robert Leighton Noakes, II, Lafayette, CA (US); Suraj Prakash Dasika, Santa Clara, CA (US); Theodore James Wagner, Arvada, CO (US); Thomas Banola, Belmont, CA (US); Padmanabha Rao Rayadurga Vithal Rao, Sunnyvale, CA (US)

(73) Assignee: EQUINIX, INC., Redwood City, CA (US)

( * ) Notice: Subject to any disclaimer, the term of this patent is extended or adjusted under 35 U.S.C. 154(b) by 720 days.

(21) Appl. No.: 15/414,697

(22) Filed: Jan. 25, 2017

Related U.S. Application Data

(60) Provisional application No. 62/319,627, filed on Apr. 7, 2016.

(51) Int. Cl.
*G06Q 30/00* (2012.01)
*G06Q 30/06* (2012.01)
*H04L 29/06* (2006.01)

(52) U.S. Cl.
CPC ....... *G06Q 30/0633* (2013.01); *H04L 63/101* (2013.01)

(58) Field of Classification Search
CPC .................................................. G06Q 30/0601
USPC ....................................................... 705/26.1
See application file for complete search history.

(56) References Cited

U.S. PATENT DOCUMENTS

| | | | |
|---|---|---|---|
| 8,379,656 B2 | 2/2013 | Waldrop et al. | |
| 8,537,845 B2 | 9/2013 | Waldrop et al. | |
| 8,583,503 B2 | 11/2013 | Waldrop et al. | |
| 8,751,323 B2 | 6/2014 | Waldrop et al. | |
| 9,269,061 B2 | 2/2016 | Jeyapaul et al. | |
| 2011/0145903 A1* | 6/2011 | Lillie .................... | G06F 21/604 726/7 |
| 2013/0013442 A1* | 1/2013 | Waldrop ............ | G06Q 30/0611 705/26.4 |
| 2016/0127454 A1 | 5/2016 | Maheshwari et al. | |

(Continued)

OTHER PUBLICATIONS

Anonymous, Altair Introduces Advanced Scheduling Features with PBS Professional(TM) 9.2: Eligible time, tunable formula and standing reservations help customers achieve higher ROI, May 20 2008, PR Newswire (Year: 2008).*

(Continued)

*Primary Examiner* — Brittney N Miller
(74) *Attorney, Agent, or Firm* — Shumaker & Sieffert, P.A.

(57) ABSTRACT

In general, this disclosure describes techniques for hierarchical management of co-location facility assets and permissions. For example, techniques are described for managing permissions for sub-customer access to reseller assets of a co-location facility, where the sub-customers are customers of the reseller. The techniques as described herein may, as a result, enable customers that become resellers to assign assets of the cloud exchange and manage sub-customer permissions to those assigned assets, including sub-customer orderings and/or access of assets associated with one or more geographically distinct co-location facilities and port-level assets.

20 Claims, 19 Drawing Sheets

(56) References Cited

U.S. PATENT DOCUMENTS

2016/0308762 A1   10/2016  Teng et al.
2016/0337473 A1   11/2016  Rao
2017/0093702 A1    3/2017  Teng et al.
2017/0111220 A1    4/2017  Kumar et al.

OTHER PUBLICATIONS

Rosen et al., "BGP/MPLS IP Virtual Private Networks (VPNs)," RFC 4364, Network Working Group, The Internet Society, Feb. 2006, 47 pp.

\* cited by examiner

CREATE A NEW CUSTOMER ACCOUNT

Create an account for a new customer by filling out the form below. You will be able to assign assets to this customer after the account has been activated.

Reseller Account Number — 912

Customer Name* — Enter Name

Customer Billing Type* — Non-Billable — 914

Customer Address* — 916
- Enter Address Line 1
- Enter Address Line 2
- Enter City
- Select Country
- Other / Zipcode
- Enter State Reseller Notification Contact*

Name — Company Name — Email

▼ Cloud Exchange Portal Permissions

Select the Cloud Exchange Portal roles and permissions for this user.

☑ Cloud Exchange Portal: access ─ 942
  ☑ View all current and future ports, connections and services ─ 944
  ☐ Place connection and service orders for all current and future ports. ─ 945

| Location | Port | View ports, connections, and services | Place connection and service orders |
|---|---|---|---|
| Select All | | ▸ | ▸ |
| ▼ San Jose — 946 | | | |
| SV1 | Equinix-SV1-EEE-01 — 947 | ▸ | ▸ |
| SV1 | Equinix-IT-SV1-CX-SEC-01 | ▸ | ▸ |
| SV5 | Equinix-IT-SV5-CX-PRI-01 | ▸ | ▸ |
| SV3 | Eqix-techdev-SV3-CX-PRI-01 | ▸ | ▸ |
| SV3 | Eqix-techdev-SV3-CX-SEC-01 | ▸ | ▸ |
| SV5 | dxcon-fgsmi6i3 | ▸ | ▸ |
| SV1 | dxcon-fgptdigg | | ▸ |

SUBCUSTOMER 1
(Select a different Customer)

INSTALL BASE

The information displayed on this page is a summary of the _____ products and services your organization has purchased. Click any listed item's serial number to view or print complete details or to request a de/install. Click the Options tab to select filters and enter search criteria that will allow you to export a customized report of your Install Base.

Options 1-2 of 2 items    1  2  3  4  5

| Serial Number | Order Number | Product Type | IBX / Cage — 956 | Product Des... | Account Num. | Installed |
|---|---|---|---|---|---|---|
| cad-20056580  1.3873.2545.0911 | | Cabinet | AT1.02:NAM208 | Cabinet | 161377 | Mar 23, 20 |

— 954    — 952

Photo/Sales
Account
161377 : Reseller Customer 1
Location
AT1.02:NAM208:Reseller Customer 1
Details                        Value
Asset No.
Customer Reference #           4-3873.2345291

METHOD, SYSTEM, AND MEDIUM FOR ASSET-BASED PERMISSIONS MANAGEMENT FOR RESELLERS OF CLOUD EXCHANGE ASSETS

PRIORITY CLAIM

This application claims the benefit of U.S. Provisional Application No. 62/319,627, filed Apr. 7, 2016, the entire content of which is incorporated by reference herein.

TECHNICAL FIELD

The disclosure relates to co-location facilities and, more specifically, to a co-location facility for interconnecting customers of the co-location facility provider.

BACKGROUND

A co-location facility provider (a "provider") may employ a communication facility, such as a data center or warehouse, in which multiple customers of the provider locate network, server, and storage gear and interconnect to a variety of telecommunications, cloud, and other network service provider(s) with a minimum of cost and complexity. Such co-location facilities may be shared by the multiple customers. By using co-location facilities of the provider, customers of the provider including telecommunications providers, Internet Service Providers (ISPs), application service providers, service providers, content providers, and other providers, as well as enterprises, may enjoy less latency and the freedom to focus on their core business.

Customers co-located at a co-location facility typically lease space or storage capacity for a set duration. Assets at a co-location facility, such as cabinets, cages, and ports, may provide customers the leased space or storage capacity. Some customers that lease assets at a co-location facility may wish to resell the use of those assets.

SUMMARY

In general, this disclosure describes techniques for hierarchical management of co-location facility assets and permissions. For example, techniques are described for managing permissions for sub-customer access to reseller assets of a co-location facility, where the sub-customers are customers of the reseller. The techniques as described herein may, as a result, enable customers that become resellers to assign assets of the cloud exchange and manage sub-customer permissions to those assigned assets, including sub-customer orderings and/or access of assets associated with one or more geographically distinct co-location facilities and port-level assets.

In some cases, a co-location facility may provide access to a cloud-based services exchange, or "cloud exchange," to facilitate virtual connections for cloud services delivery from multiple cloud service providers to one or more cloud customers. The cloud exchange may enable cloud customers to bypass the public Internet to directly connect to cloud services providers so as to improve performance, reduce costs, increase the security and privacy of the connections, and leverage cloud computing for additional applications. The programmable network platform enables the cloud exchange provider that administers the cloud exchange to enable resellers to manage particular assets and permission to the assets such that sub-customers may transparently access the cloud exchange without further interaction by the reseller.

The techniques of this disclosure may provide one or more advantages. For example, the techniques may avoid cluttering the cloud exchange provider's system with separate individual sub-customer accounts. The techniques may allow resellers to manage one-to-many relationships between reseller and sub-customers, allow sub-customers to manage their own cloud platform access and with limited visibility, allow multiple sub-customers per cabinet/port, allow sub-customers to order services to support use of the assets, and/or support direct and indirect billing of sub-customers for non-space and power, without requiring creation of virtual cage and/or virtual cabinets for sub-customer accounts in a system.

In one example, a method includes receiving, by a programmable network platform and from a customer of a co-location facility, a request for a sub-customer of the customer to access one or more assets assigned to the customer of the co-location facility, wherein the request comprises an indication of at least one permission for the sub-customer for accessing the one or more assets via the programmable network platform; configuring, by the programmable network platform based on the indication of the at least one permission, permissions for the one or more assets to enable the sub-customer of the customer to access the one or more assets; receiving, by the programmable network platform and from the sub-customer, a request to access the one or more assets; and outputting, in response to the request to access the one or more assets, by the programmable network platform based on the permissions, an indication of access by the sub-customer to the one or more assets.

In another example, a network data center includes a programmable network platform comprising one or more hardware-based processors configured to: receive, from a customer of a co-location facility, a request for a sub-customer of the customer to access one or more assets assigned to the customer of the co-location facility, wherein the request comprises an indication of at least one permission for the sub-customer for accessing the one or more assets via the programmable network platform; configure, based on the indication of the at least one permission, permissions for the one or more assets to enable the sub-customer of the customer to access the one or more assets; receive, from the sub-customer, a request to access the one or more assets; and output, in response to the request to access the one or more assets, by the programmable network platform based on the permissions, an indication of access by the sub-customer to the one or more assets.

In a further example, a computer-readable storage medium has stored thereon instructions that, when executed, cause a programmable processor to receive, from a customer of a co-location facility, a request for a sub-customer of the customer to access one or more assets assigned to the customer of the co-location facility, wherein the request comprises an indication of at least one permission for the sub-customer for accessing the one or more assets via the programmable network platform; configure, based on the indication of the at least one permission, permissions for the one or more assets to enable the sub-customer of the customer to access the one or more assets; receive, from the sub-customer, a request to access the one or more assets; and output, in response to the request to access the one or more assets, by the programmable network platform based on the permissions, an indication of access by the sub-customer to the one or more assets.

The details of one or more examples are set forth in the accompanying drawings and the description below. Other features, objects, and advantages will be apparent from the description and drawings, and from the claims.

BRIEF DESCRIPTION OF DRAWINGS

FIGS. 9A-9G illustrate example interfaces of a programmable network platform that enables reseller configuration of assets and user permissions for sub-customer access to assets of a cloud-based service exchange network.

DETAILED DESCRIPTION

In general, this disclosure describes techniques for cloud resellers to manage permissions of assets of a cloud-based service exchange ("cloud exchange") network for sub-customers. For example, the techniques may extend reseller management capabilities to include sub-customer asset based permission management. Customers that become resellers may manage permissions of assets for sub-customers with a programmable network platform, including the management of orderings and/or access of cabinets, ports within each of the cabinets, and/or virtual circuits. In this way, resellers may efficiently run their business when connecting their sub-customers to the programmable network platform, and enable sub-customers to transparently interact with the cloud exchange provider through the reseller.

According to various examples described herein, a co-location facility may provide access to a cloud exchange to facilitate virtual connections for cloud services delivery from multiple cloud service providers to one or more cloud customers. A cloud exchange is described that allows private networks of any customer to be directly cross-connected to any other customer at a common point, thereby allowing direct exchange of network traffic between the networks of the customers. Customers may include network carriers (or network service providers), enterprises, and other users of cloud services offered by one or more cloud service providers. As further described herein, the customers may become resellers and aggregators of sub-customers accessing the cloud exchange. Customers/Resellers may also include network service providers ("NSPs") as aggregators. The techniques enable the resellers to manage assets including delegations, restrictions, and/or permissions applied to sub-customers and allocated to particular assets in the cloud exchange. For example, the reseller may orchestrate port and service requests within an end-customer port for an account that is in its hierarchy such that sub-customers may only see their orders and services without seeing adjacent accounts represented by the reseller. In other words, the reseller may orchestrate connections within a reseller port on behalf of a particular sub-customer. In some examples, the reseller can delegate the ability to orchestrate connections within the reseller port to the sub-customer, such that the reseller can remove itself from the orchestrator role while still maintaining ultimate control over the sub-customer's account.

Figure 1:
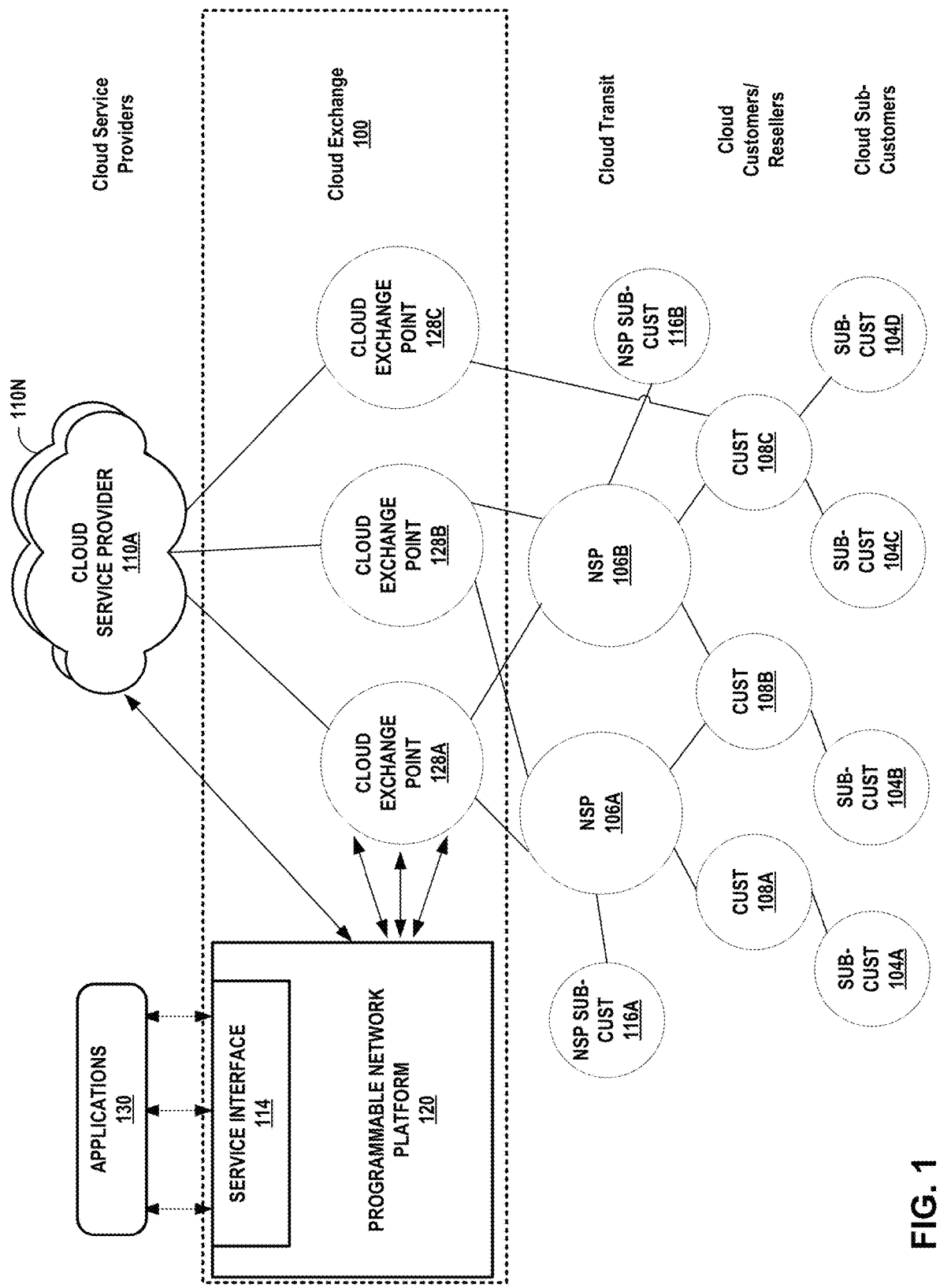
FIG. 1 illustrates a conceptual view of a network system that enables permissions management of sub-customers of a cloud exchange according to techniques described herein.

FIG. 1 illustrates a conceptual view of a network system 2 that enables permissions management of sub-customers of a cloud exchange according to techniques described herein. Each of cloud-based services exchange points 128A-128C (described hereinafter as "cloud exchange points" and collectively referred to as "cloud exchange points 128") of cloud-based services exchange 100 ("cloud exchange 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which customers/resellers ("cloud resellers"), sub-customers, and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers/resellers 108A-108C (collectively, "cloud resellers 108") and sub-customers 104A-104D (collectively, "sub-customers 104") of respective cloud resellers 108 receive cloud services from multiple cloud service providers 110A-110N (collectively, "cloud service providers 110"). In general, cloud resellers and/or sub-customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100. As further described below, cloud resellers 108 may configure permissions for sub-customers 104 to connect to cloud-based services exchange on behalf of cloud resellers 108. Dependent upon the configured permissions, sub-customers 104 may be permitted or denied access to cloud-based assets and services directly via a layer 3 peering and physical connection to one of cloud exchange points 128 or indirectly via one of network service providers 106A-106B (collectively, "NSPs 106," or alternatively, "carriers 106").

NSPs 106 provide "cloud transit" by maintaining a physical presence within one or more of cloud exchange points 128 and aggregating layer 3 access from one or more cloud resellers 108. NSPs 106 may peer, at layer 3, directly with one or more cloud exchange points 128 and in so doing offer indirect layer 3 connectivity and peering to one or more cloud resellers 108 by which cloud resellers 108 may obtain cloud services from the cloud exchange 100. In accordance to techniques of this disclosure, cloud resellers 108 may manage permissions of assets that connect sub-customers 104 to the NSPs 106.

Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to cloud reseller 108. As a result, in accordance with the permissions configured by cloud resellers 108, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to sub-customers 104. In other words, cloud exchange points 128 may internalize the eBGP peering relationships that cloud service providers 110 and sub-customers 104 would maintain on a pair-wise basis. Instead, a sub-customer 104 may configure a single eBGP peering relationship with a cloud exchange point 128 via the permissions configured by cloud resellers 108 and receive, via the cloud exchange 100, multiple cloud services from one or more cloud service providers 110 in a transparent manner. While described herein primarily with respect to eBGP or other layer 3 routing protocol peering between cloud exchange points and customer, NSP, or cloud service provider networks, the cloud exchange points may learn routes from these networks in other ways, such as by static configuration, or via Routing Information Protocol (RIP), Open Shortest Path First (OSPF), Intermediate System-to-Intermediate System (IS-IS), or other route distribution protocol.

As examples of the above, cloud reseller 108A is illustrated as having contracted with a cloud exchange provider for cloud exchange 100 to directly access layer 3 cloud services via cloud exchange points 128A and also to have contracted with NSP 106A to access layer 3 cloud services via a transit network of the NSP 106A. In this way, cloud reseller 108A receives redundant layer 3 connectivity to cloud service provider 110A, for instance.

According to the techniques described herein, cloud reseller 108A may also configure permissions of assets and/or sub-customer 104A for the sub-customer to receive cloud-based services on behalf of cloud reseller 108A. In this way, resellers 108 may set up an account on behalf of their sub-customer.

The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and cloud reseller 108 networks, all having at least one port offering connectivity within one or more of the cloud exchange points 128. In accordance with the techniques described herein, cloud reseller 108 may manage asset permissions for sub-customers 104 to utilize the assets of the cloud reseller 108 networks to connect with one or more of the cloud exchange points 128. In some examples, cloud reseller 108 may manage assets such as cabinets, ports within each cabinet, and/or virtual circuits for which sub-customers 104 may receive cloud-based services exchange. Cloud reseller 108 may allow multiple sub-customers per cabinet, port, and/or virtual circuit. This way, resellers 108 may manage one-to-many relationships between the cloud resellers 108 and sub-customers 104.

Cloud exchange 100 allows a corresponding one of cloud resellers 108 of any network service providers (NSPs) or "carriers" 106A-106B (collectively, "NSPs 106" or "carriers 106") or other cloud resellers to be directly cross-connected, via a virtual layer 2 (L2) or layer 3 (L3) connection to any other customer/reseller network and/or to any of CSPs 110, thereby allowing direct exchange of network traffic among the customer networks and CSPs 110. Similarly, cloud resellers 108 may manage assets for sub-customers 104 to directly exchange network traffic among the sub-customer networks and CSPs 110.

In this way, cloud exchange 100 streamlines and simplifies the process of partnering CSPs 110 and sub-customers 104 (via permissions established by cloud resellers 108) in a transparent and neutral manner. In one example, cloud exchange 100 is a co-location and interconnection data center in which CSPs 110, NSPs 106, cloud resellers 108, and/or sub-customers 104 may already have network presence, such as by having one or more accessible ports available for interconnection within the data center, which may represent any of cloud exchange points 128. This allows the participating NSPs, customers, and CSPs to have a wide range of interconnectivity options within the same facility. In this way, a sub-customer 104 may have options to create many-to-many interconnections with only a one-time hook up to one or more cloud exchange points 128 based upon the cloud reseller's management of rights and permissions to the cabinets, ports, and/or virtual circuits. In other words, instead of a sub-customer having to establish separate connections across transit networks to access different cloud service providers or different cloud services of one or more cloud service providers, cloud exchange 100 allows cloud resellers to manage the permissions of its assets for sub-customers to interconnect to multiple CSPs and cloud services. Cloud resellers 108 may, for example, seamlessly manage sub-customer orderings and/or access and/or purchase on behalf of sub-customers 104.

In accordance with techniques described herein, cloud exchange 100 includes a programmable network platform 120 for dynamically programming cloud exchange 100 to responsively and assuredly manage the permissions of assets associated with cloud resellers 108 such that sub-customers 104 of cloud resellers 108 may be permitted or denied access to assets and/or services provided by cloud exchange 100 and/or cloud service providers 110 coupled to the cloud exchange 100. The programmable network platform 120 as described herein may, as a result, orchestrate a permissions based business-level service for sub-customers 104 across heterogeneous cloud service providers 110 according to well-defined service policies, quality of service policies, service level agreements, and costs, and further according to a service topology for the business-level service.

The programmable network platform 120 enables the cloud service provider that administers the cloud exchange 100 to dynamically configure and manage the cloud exchange 100 to, for instance, enable cloud resellers 108 to configure permissions for assets, such as to delegate or restrict ports and/or virtual circuits for sub-customers 104 for cloud-based services delivery from multiple cloud service providers 110 to one or more cloud sub-customers 104. The cloud exchange 100 may enable sub-customers 104 to order assets of cloud reseller 108 to bypass the public Internet to directly connect to cloud services providers 110 via permissions configured by the cloud resellers 108 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In some examples, resellers 108 may further request services made on behalf of sub-customers 104 such that sub-customers may elect to selectively approve the service (e.g., as a bundled package or separate list) requests or to automatically approve all service requests made by reseller 108.

Programmable network platform 120 may represent an application executing within one or more data centers of the cloud exchange 100 or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning and permissions based management for multiple different cloud exchanges. Alternatively or additionally, multiple separate instances of the programmable network platform 120 may control service provisioning and permissions based management for respective multiple different cloud exchanges.

In the illustrated example, programmable network platform 120 includes a service interface (or "service API") 114 that defines the methods, fields, and/or other software primitives by which applications may invoke the programmable network platform 120. The service interface 114 may allow cloud resellers 108 programmable access to manage capabilities and assets of the cloud exchange 100 for respective sub-customers 104.

For example and as further described herein, the service interface 114 may enable cloud resellers 108 to permit or deny sub-customer access to virtual circuits, cabinets, ports within the cabinets, and/or patch panels in the cloud exchange for interconnecting sub-customers 104 and cloud service provider networks. In this way, the programmable network platform 120 provides a permission based management system to enable cloud resellers 108 to configure and/or manage the permissions of sub-customers 104 such that sub-customers 104 may have a direct relationship with the cloud-based services exchange via the resellers assets.

In some examples, network service providers ("NSPs") 106 may be resellers of access to cloud exchange 100 to network service provider sub-customers 116A-116B (collectively, "NSP sub-customers 116"). Utilizing the techniques described above, NSPs 106 may leverage and connect their devices and services for NSP sub-customers 116. In some examples, the ability for NSP sub-customers 116 to access the cloud exchange may be enabled by providing multi-virtual routing and forwarding ("VRF") to cloud VRF consolidation for carrier simplification. For example, different sub-customers may be tied to different VRF instances, allowing for differentiation and isolation between sub-customers. In some cases, back-to-back VRF instances may be used.

Simplification increases adoption of, for example, automated service request ("ASR") interface support via an application program interface ("API"). Simplification also enables automated Letters of Authorization ("LOAs") such that when sub-customers apply for a new tie down online, the sub-customer receives an assignment within minutes. Simplification may also enable online loading function for documents to and from an account. Simplification also may track multiple levels of account and order identifiers per service instance that can be labeled and identified by the account owner or provider.

NSPs 106 may use the programmable network platform effectively as their own cloud connection platform such that NSPs 106 may create a method for service providers to effectively make a decision to either buy or build on private cloud connectivity. For example, NSPs 106 may license the cloud exchange provided by the cloud exchange provider and may use programmable network platform to deploy the cloud exchange as part of the NSP infrastructure. The NSPs 106 may manage branding and control NSP sub-customer 116 access and integration into their systems. Cloud exchange provider may then provide NSP platform capabilities, documentation and roadmap key items, support for end-to-end testing and fault detection, and provide NSPs 106 access to channel-type hierarchy (e.g., master agent, agent, value added reseller (VAR), accounts, account user, account approver). The cloud exchange provider may also provide policy-driven control plane access or some method of software development networking ("SDN") integration with NSPs 106.

Although FIG. 1 is described with respect to a cloud exchange, the techniques of this disclosure may be applied to other exchanges, including Internet exchanges and/or Ethernet exchanges. Example details of exchanges can be found in U.S. Provisional Patent Application 62/149,374, filed Apr. 17, 2015 and entitled "Cloud-Based Services Exchange," which is incorporated herein by reference in its entirety.

Example details of services exchanges for Ethernet and L3/Internet with direct L3/BGP peering are found in U.S. Pat. No. 8,537,845 entitled "REAL TIME CONFIGURATION AND PROVISIONING FOR A CARRIER ETHERNET EXCHANGE," filed Sep. 13, 2012; U.S. Patent Application titled "REAL TIME CONFIGURATION And PROVISIONING FOR A CARTER ETHERNET EXCHANGE," filed Sep. 2, 2010 having application Ser. No. 12/875,054, which claims the benefit of and priority to all three: 1) U.S. Provisional Application titled "ETHERNET EXCHANGE" filed on Dec. 10, 2009 having application Ser. No. 61/285,371 and is incorporated herein by reference in its entirety; 2) U.S. Provisional Application titled "PRIVATE NETWORK CONNECTIVITY PLATFORM" filed on Sep. 4, 2009 having application Ser. No. 61/239,007 and is incorporated herein by reference in its entirety; and 3) U.S. Provisional Application titled "ETHERNET EXCHANGE" filed on Apr. 12, 2010 having application Ser. No. 61/323,066 and is incorporated herein by reference in its entirety, and U.S. Patent Application titled "REAL TIME CONFIGURATION AND PROVISIONING FOR A CARRIER ETHERNET EXCHANGE" filed on Sep. 2, 2010 having application Ser. No. 12/875,054. Each of the above patents and patent applications are incorporated herein by reference in their respective entireties.

Further example details of a cloud-based services exchange can be found in U.S. Provisional Patent Application 62/072,976, filed Oct. 30, 2014 and entitled "INTERCONNECTION PLATFORM FOR REAL-TIME CONFIGURATION AND MANAGEMENT OF A CLOUD-BASED SERVICES EXCHANGE;" and in U.S. patent application Ser. No. 15/001,766, filed Jan. 20, 2016 and entitled "MULTI-CLOUD, MULTI-SERVICE DATA MODEL," each of which are incorporated herein by reference in their respective entireties.

Figure 2:
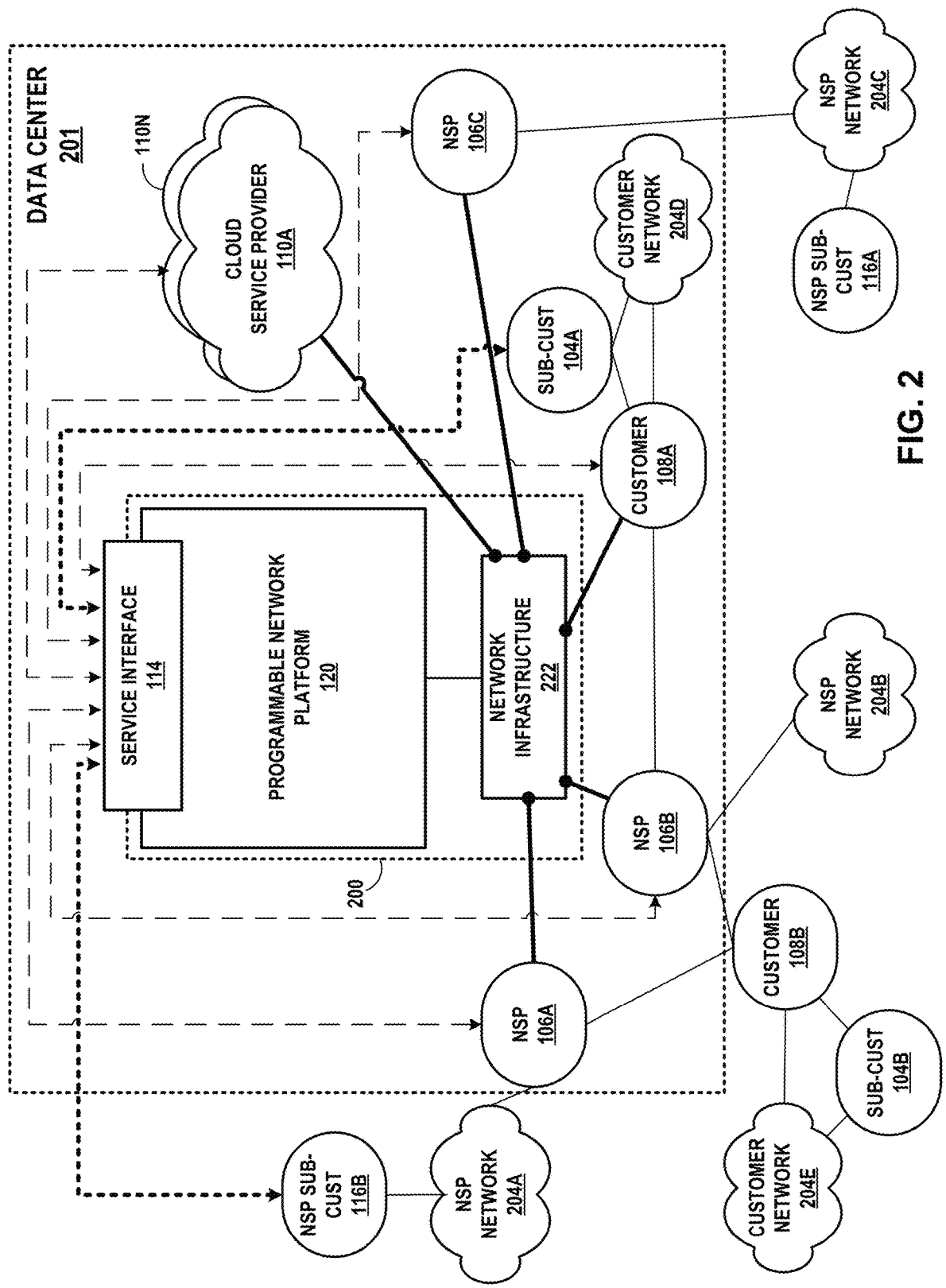
FIG. 2 is a block diagram illustrating a high-level view of a data center that provides an operating environment for permissions based management of sub-customers of a cloud-based services exchange, according to techniques described herein.

FIG. 2 is a block diagram illustrating a high-level view of a data center 201 that provides an operating environment for permissions based management of sub-customers of a cloud-based services exchange 200, according to techniques described herein. Cloud-based services exchange 200 ("cloud exchange 200") allows a corresponding one of customer networks 204D, 204E (collectively, "customer networks 204") and NSP networks 204A-204C (collectively, "'private' or 'carrier' networks 204") to be directly cross-connected, via a layer 3 (L3) or layer 2 (L2) connection to any other customer network and/or to any of cloud service providers 110A-110N, thereby allowing exchange of cloud service traffic among the customer networks and CSPs 110. Data center 201 may be entirely located within a centralized area, such as a warehouse or localized data center complex, and provide power, cabling, security, and other services to NSPs, NSP customers, cloud customers, cloud sub-customers, and cloud service providers that locate their respective networks within the data center 201 (e.g., for co-location) and/or connect to the data center 201 by one or more external links.

Network service providers 106A, 106B may each represent a network service provider that is associated with a transit network by which network subscribers of NSP 106A, 106B may access cloud services offered by CSPs 110 via the cloud exchange 200.

In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200. In accordance to the techniques of this disclosure, cloud resellers may manage permissions for sub-customers 104A, 104B (collectively, "sub-customers 104") and/or NSP sub-customers 116A, 116B (collectively, "NSP sub-customers 116") to access cloud services offered by CSPs 110 via the cloud exchange 200 in a transparent and neutral manner.

One example application of cloud exchange 200 is a co-location and interconnection data center in which CSPs 110, NSPs 106 and/or cloud resellers 108 may already have network presence, such as by having one or more accessible ports available for interconnection within the data center. This allows the participating carriers, customers, and CSPs to have a wide range of interconnectivity options in the same facility. Cloud resellers 108 and NSPs 106 may, for example, configure permissions for sub-customers 104 and NSP sub-customers 116, respectively, to utilize the accessible assets (e.g., ports) of the resellers for sub-customer interconnection within the data center.

Cloud exchange 200 of data center 201 includes network infrastructure 222 that provides a L2/L3 switching fabric by which CSPs 110 and customers/NSPs interconnect. This enables an NSP/customer to have options to create many-to-many interconnections with only a one-time hook up to the switching network and underlying network infrastructure 222 that presents an interconnection platform for cloud exchange 200. In other words, instead of having to establish separate connections across transit networks to access different cloud service providers or different cloud services of one or more cloud service providers, cloud exchange 200 allows customers and/or sub-customers to interconnect to multiple CSPs and cloud services using network infrastructure 222 within data center 201, which may represent any of the edge networks described in this disclosure, at least in part.

By being connected to and utilizing cloud exchange 200, customers and/or sub-customers can purchase services and reach out to many end users in many different geographical areas without incurring the same expenses typically associated with installing and maintaining multiple virtual connections with multiple CSPs 110. In accordance with the techniques of this disclosure, cloud customers may permit sub-customers access to its assets in the cloud exchange. In one example, the techniques of this disclosure enable cloud resellers to access programmable network platform 120 via service interface 114 to view and/or order assets. In one example, customer 108A may define permissions for sub-customer 104A to view assets assigned to customer 108A to connect to cloud service provider 110A. Based on these permissions, sub-customer 104A may access programmable network platform 120 via service interface 114 to view assets assigned to customer 108A. In some examples, NSP 106A may define permissions for NSP sub-customer 116B to view and order assets assigned to NSP 106A to connect to cloud service provider 110A. Based on these permissions, NSP sub-customer 116B may access programmable network platform 120 via service interface 114 to view and/or order assets assigned to NSP 106A. In this way, the permissions enable only the sub-customers with the right permissions to view and/or order the assets of resellers through programmable network platform 120. In other words, not only are sub-customers limited in accessing cloud exchange environments, but sub-customers also have limited or no visibility to other sub-customer environments within the cloud exchange.

Cloud exchange 200 includes a programmable network platform 120 that exposes at least one service interface, which may include in some examples and are alternatively referred to herein as application programming interfaces (APIs) in that the APIs define the methods, fields, and/or other software primitives by which applications may invoke the programmable network platform 120. The software interfaces allow NSPs 106 and customers 108 programmable access to capabilities and assets of the cloud exchange 200. The software interfaces may additionally allow customers 108 and NSPs 106 to configure sub-customer permissions to access capabilities and assets of the cloud exchange 200. For example, the cloud reseller may configure roles and port level permissions to sub-customers including the sub-customer's ability to view assets and/or to place connection orders on those assets. The programmable network platform 120 may alternatively be referred to as a controller, provisioning platform, provisioning system, service orchestration system, cloud exchange platform, etc., for establishing end-to-end services including, e.g., connectivity between customers and cloud service providers and permissions based management of sub-customers and assets according to techniques described herein.

In one example, on the buyer side, the software interfaces presented by the underlying interconnect platform provide an extensible framework that allows software developers associated with the customers of cloud exchange 200 (e.g., customers 108) to create software applications that allow and leverage access to the programmable network platform 120 by which the applications may request that the cloud exchange 200 establish connectivity between the customer and cloud services offered by any of the CSPs 110. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to cloud service providers, delete virtual circuits, obtain active virtual circuit information, obtain details surrounding CSPs partnered with the cloud exchange provider, obtain customized analytics data, validate partner access to interconnection assets, and assure service delivery. Similarly, customers 208 may become resellers that may configure permissions of sub-customers, e.g., to obtain authorization to access the cloud exchange through reseller assets (e.g., cabinets, ports, and virtual circuits), obtain information regarding available cloud services, view active ports and virtual circuit details of the assets, and place virtual circuit orders of the cabinet/port.

On the cloud service provider (seller) side, the software interfaces may allow software developers associated with cloud providers to manage their cloud services and to enable customers and/or sub-customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

As further described herein, the service interface 114 facilitates machine-to-machine communication to enable dynamic service provisioning and service delivery assurance, and a permission based management of assets and sub-customers. In this way, the programmable network platform 120 provides improved granularity for rights and access management of sub-customers. For example, the software interfaces may provide an automated and seamless way for a cloud reseller to establish, de-install, manage interconnection with multiple, different cloud providers participating in the cloud exchange, and manage permissions for sub-customers to view and/or order connections of its assets. The programmable network platform 120 may in various examples execute on one or more virtual machines and/or real servers of data center 201, or off-site.

In the example of FIG. 2, network infrastructure 222 represents the cloud exchange switching fabric and includes multiple assets (e.g., ports) that may be dynamically interconnected with virtual circuits by, e.g., invoking service interface 114 of the programmable network platform 120. Each of the assets is associated with one of NSPs 106, customers 108, and CSPs 110. Customers 108A, 108B may, via the programmable network platform 120, manage permissions of sub-customers 104A, 104B to access these assets. Similarly, NSPs 106A, 106B may, via the programmable network platform 120, manage permissions of NSP sub-customers 116A, 116B to access assets. In this way, sub-customers may view and/or place orders on the multiple assets dynamically interconnected with virtual circuits, such that sub-customers may access the cloud exchange.

Figure 3:
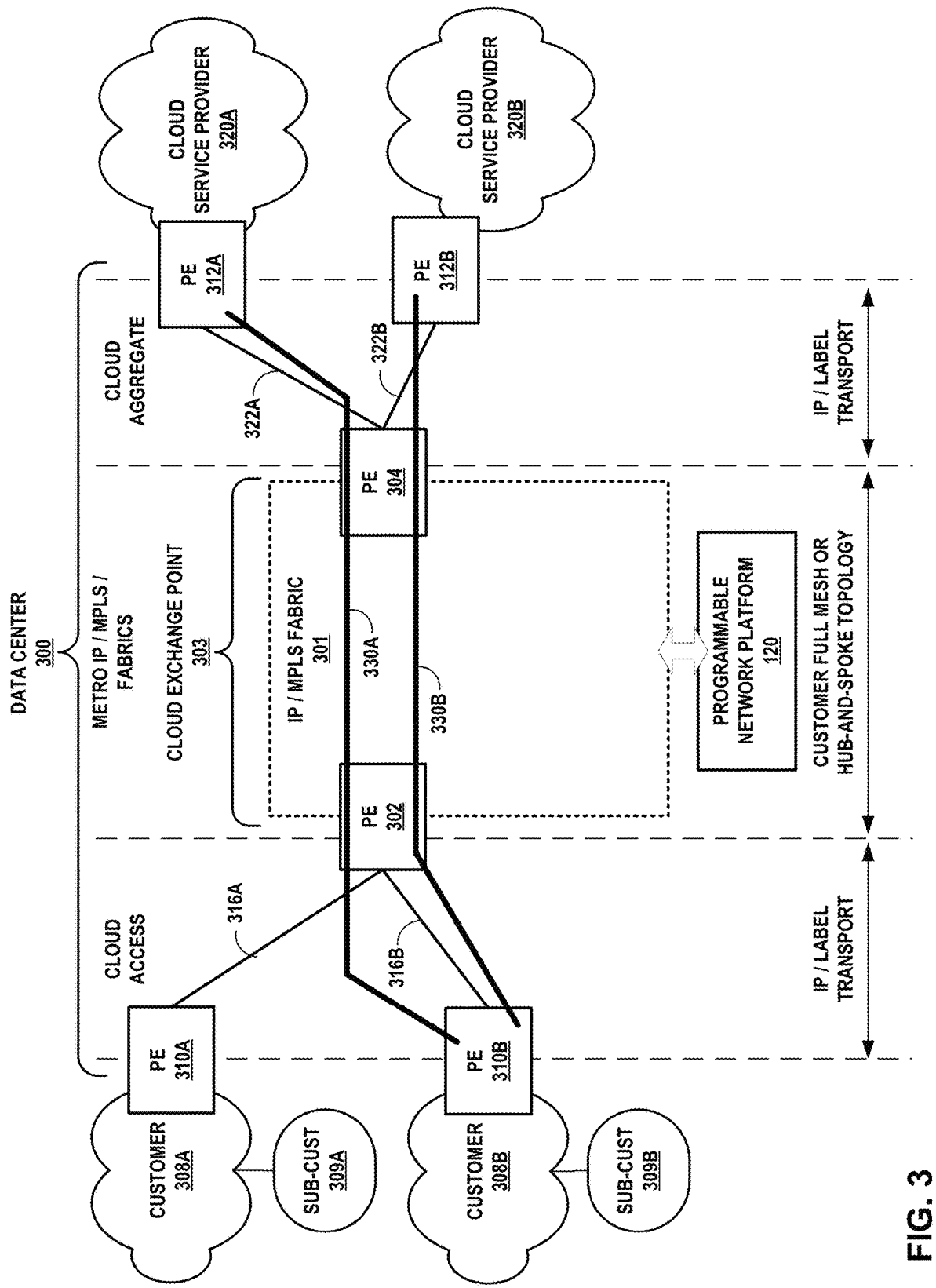
FIG. 3 is a block diagram illustrating an example network infrastructure for permissions management of sub-customers to access the cloud services of multiple cloud service providers, in accordance with techniques described in this disclosure.

FIG. 3 is a block diagram illustrating an example network infrastructure for permissions management of sub-customers to access the cloud services of multiple cloud service providers, in accordance with techniques described in this disclosure. In the example of FIG. 3, customer networks 308A, 308B (collectively, "customer networks 308"), each associated with a different customer, access a cloud exchange point within a data center 300 in order to receive aggregated cloud services from one or more cloud service provider networks 320A, 320B (collectively, "CSPs 320"). Customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308 include respective provider edge/autonomous system border routers 310A, 310B (collectively, "PEs 310"). Each of PEs 310 may execute exterior gateway routing protocols to peer with PE router 302A over one of access links 316A, 316B (collectively, "access links 316"). In various examples, any of PEs 310 may alternatively be or otherwise represent customer edge devices. In the example of FIG. 3, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN, stacked VLAN (e.g, QinQ), or a triple-stacked VLAN (e.g., QinQinQ) for sub-customers, a VxLAN, an LSP, a GRE tunnel, or other type of tunnel.

In some examples, customers 308 may resell its own access to cloud exchange point 303 to sub-customers 309A, 309B (collectively, "sub-customers 309"), respectively. Based on the reseller permissions for sub-customers 309, the sub-customers may be granted certain access to the cloud exchange point 303 through the same physical connection between at least one port of customer network 308 and at least one port of cloud exchange point 303.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A, 312B (collectively, "PEs 312") that each executes an exterior gateway routing protocol, e.g., eBGP, to exchange routes with PE router 304 of cloud exchange point 303 via aggregation links 322A, 322B (collectively, "aggregation links 322"). Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PE 302 and PE 304. IP/MPLS fabric 301 includes one or more switching and routing devices, including PEs 302, 304, that provide IP/MPLS switching and routing of IP packets to form an IP backbone. In some examples, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 and/or sub-customers 309 with multiple cloud service provider networks 320 to provide a data center-based 'transport' and layer 3 cross-connect. Whereas service provider-based IP backbone networks require wide-area network (WAN) connections with limited bandwidth to transport service traffic from layer 3 services providers to customers, the cloud exchange point 303 as described herein 'transports' service traffic and cross-connects cloud service providers 320 to customers 308 and/or sub-customers 309 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and cloud service provider network 320 may connect via respective links to the same PE router of IP/MPLS fabric 301.

While illustrated and primarily described with respect to L3 connectivity, PE routers 302 may additionally offer, via access links 316, L2 connectivity between customer networks 308 and cloud service provider networks 320. For example, a port of PE router 302 may be configured with an L2 interface that provides, to customer network 308B and/or sub-customer 309B, L2 connectivity to cloud service provider 320A via access link 316B, with the cloud service provider router 312A coupled to a port of PE router 304 that is also configured with a L2 interface. The port of PE router 302 may be additionally configured with a L3 interface that provides, to customer network 308B and/or sub-customer 309B, L3 connectivity to cloud service provider 320B via access link 316A. The port of PE router 302 may further be configured to permit or deny access to sub-customers 309 through their respective customer/reseller 308A, 308B network. That is, PE 302 may be configured with multiple L2 and/or L3 sub-interfaces such that customer 308B and/or sub-customer 309B may be provided, by the cloud exchange provider, with a one-to-many connection to multiple cloud service providers 320.

To create an L2 interconnection between customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. Customers 308 may configure permissions for sub-customers 309, respectively, to access the customer-facing port of PE 302 and the CSP-facing port of cloud service providers 320.

To create an L3 interconnection between a customer network 308 and a cloud service provider network 320, in some examples, IP/MPLS fabric 301 is configured with a L3 virtual routing and forwarding instances (VRFs), as described in further detail below with respect to FIG. 4.

Each of access links 316 and aggregation links 322 may include a network interface device (NID) that connects customer networks 308 or cloud service providers 320 to a network link between the NID and one of PE routers 302, 304. Each of access links 316 and aggregation links 322 may represent or include any of a number of different types of links that provide L2 and/or L3 connectivity.

Access links 316 include physical links. PEs 310 and PE 302 exchange L2/L3 packets via access links 316. In this respect, access links 316 constitute transport links for cloud access by customers 308 and sub-customers 309 via cloud exchange point 303. Cloud exchange point 303 may represent an example of any of cloud exchange points 128 of FIG. 1. Data center 300 may represent an example of data center 201 of FIG. 2.

Cloud exchange point 303, in some examples, aggregates customers 308 and/or sub-customers 309 access to the cloud exchange point 303 and thence to any one or more cloud service providers 320. FIG. 3, for example, illustrates access links 316A, 316B connecting respective customer networks 308A, 308B and/or sub-customers 309 to PE router 302 of cloud exchange point 303. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308 and/or sub-customers 309. That is, cloud service provider network 320A does not need to provision and configure separate service links from cloud service provider network 320A to PE routers 310, for instance, in order to provide services to each of customer network 308. Cloud exchange point 303 may instead cross-connect cloud aggregation link 322A and PE 312A of cloud service provider network 320A to multiple cloud access links 316 to provide layer 3 peering and network reachability for the cloud services delivery.

In addition, a single customer network, e.g., customer network 308B, need only to have configured a single cloud access link (here, access link 316B) to the cloud exchange point 303, within data center 300 in order to obtain services from multiple cloud service provider networks 320 offering cloud services via the cloud exchange point 303. That is, the customer operating customer network 308B does not need to provision and configure separate service links connecting customer network 308B to different PE routers 312, for instance, in order to obtain services from multiple cloud service provider networks 320. Cloud exchange point 303 may instead cross-connect cloud access link 316B (again, as one example) to multiple cloud aggregate links 322 to provide layer 3 peering and network reachability for the cloud services delivery to customer network 308B. In this way, depending on permissions of assets in the cloud exchange, sub-customer 309B may also access cloud exchange point 303 to cross-connect cloud access link 316B to multiple aggregate links 322 to provide layer 3 peering and network reachability for the cloud services delivery to sub-customer 309B.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302 may exchange IP packets with PE 310A on a bidirectional label-switched path (LSP) operating over access link 316A, the LSP being an attachment circuit for a VRF configured in PE 302. As another example, PE 304 may exchange IP packets with PE 312A on a bidirectional label-switched path (LSP) operating over access link 322A, the LSP being an attachment circuit for a VRF configured in PE 304. Each VRF may include or represent a different routing and forwarding table with distinct routes.

PE routers 302, 304 of IP/MPLS fabric 301 may be configured in respective hub-and-spoke arrangements for cloud services, with PE 304 implementing cloud service hubs and PE 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. In a hub-and-spoke arrangement for data center-based IP/MPLS fabric 301 and for southbound service traffic (i.e., from a CSP to a customer) PE 302 advertises routes, received from PEs 310, to PE 304, which advertises the routes to PEs 312. For northbound service traffic (i.e., from a customer to a CSP), PE 304 advertises routes, received from PEs 312, to PE 302, which advertises the routes to PEs 310.

For some customers and sub-customers of cloud exchange point of cloud exchange 303, the cloud exchange point 303 provider may configure a full mesh arrangement whereby a set of PEs 302, 304 each couple to a different customer site network for the customer and/or sub-customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN. Likewise, sub-customer permissions may only enable sub-customers to see services and select information about particular ports owned by the reseller in the closed user group.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 3, a cloud exchange point 303 is configured to implement multiple layer 3 virtual circuits 330A, 330B (collectively, "virtual circuits 330") to interconnect customer network 308 and cloud service provider networks 320. Each of cloud service providers 320 and customers 308 and/or sub-customers 309 may be an endpoint for multiple virtual circuits 330, with multiple virtual circuits 330 traversing one or more attachment circuits between a PE/PE pair for the IP/MPLS fabric 301 and the CSP/customer. A virtual circuit 330 represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another. In accordance with the techniques of this disclosure, resellers 308 may configure permissions enabling sub-customers 309 to view the virtual circuits and/or place orders for the virtual circuits to interconnect sub-customers 309 to cloud service providers 320.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304 via a routing protocol (e.g., eBGP) peering connection with PE 304. PE 304 associates the route with a hub-and-spoke network, which may have an associated VRF that includes spoke PE router 302. PE 304 then exports the route to PE router 302; PE router 304 may export the route specifying PE router 304 as the next hop router, along with a label identifying the hub-and-spoke network. PE router 302 sends the route to PE router 310B via a routing protocol connection with PE 310B. PE router 302 may send the route after adding an autonomous system number of the cloud exchange point 303 (e.g., to a BGP autonomous system path (AS_PATH) attribute) and specifying PE router 302 as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302, 304, and 312A may perform a similar operation in the reverse direction to forward routes originated by customer network 308B to PE 312A and thus provide connectivity from cloud service provider network 320A to customer network 308B (or sub-customer 309B).

In the example of virtual circuit 330B, PE routers 312B, 304, 302, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B and/or sub-customer 309B having a single access link 316B to the cloud exchange point 303. Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

Figure 4:
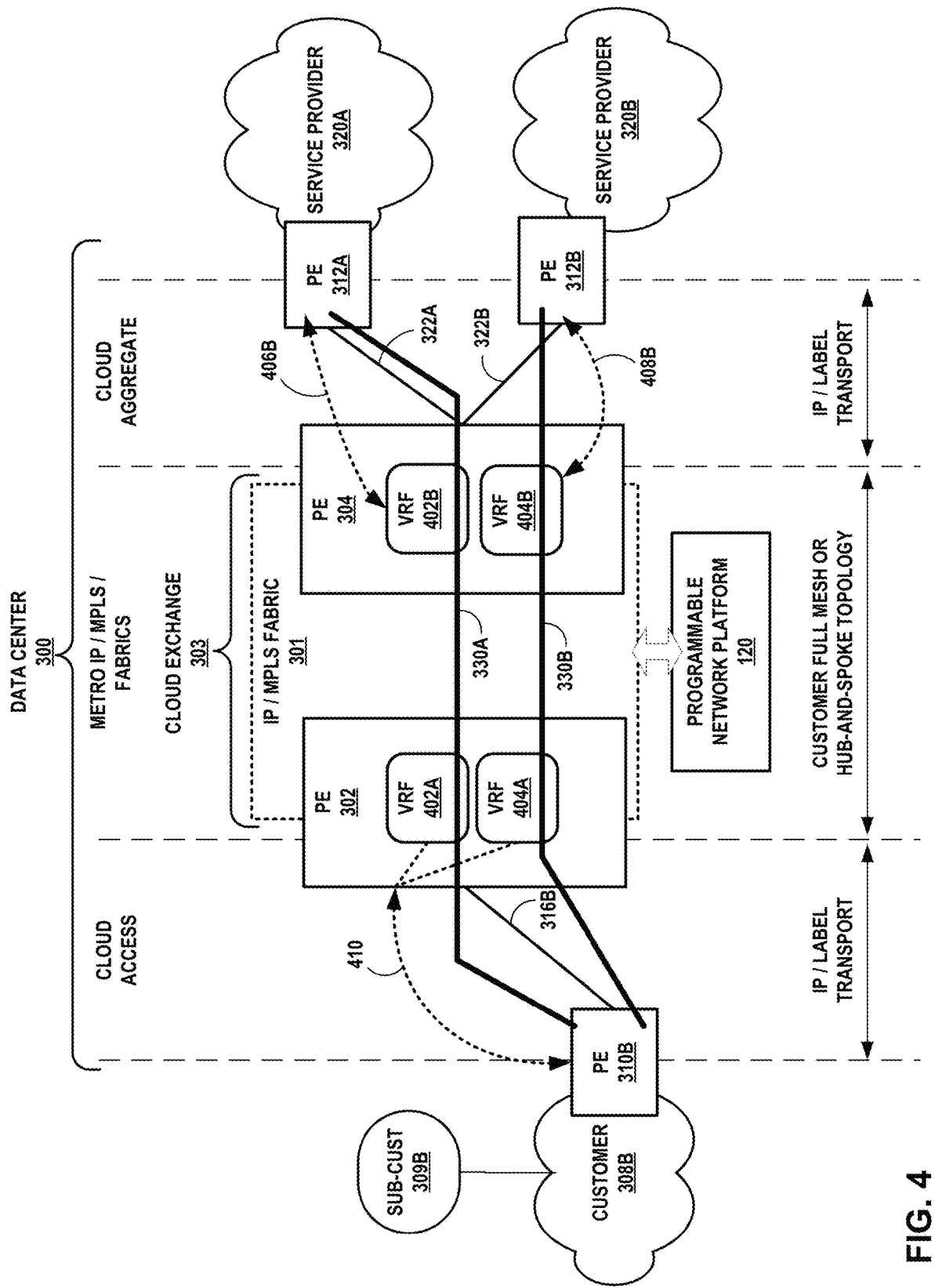
FIG. 4 is a block diagram illustrating an example of a data center-based cloud exchange point in which routers of the cloud exchange point are configured by programmable network platform with VPN routing and forwarding instances for routing and forwarding aggregated service traffic from multiple cloud service provider networks to a customer and/or sub-customer network, according to techniques described herein.

FIG. 4 is a block diagram illustrating an example of a data center-based cloud exchange point in which routers of the cloud exchange point are configured by programmable network platform 120 with VPN routing and forwarding instances for routing and forwarding aggregated service traffic from multiple cloud service provider networks to a customer network, according to techniques described herein. In this example, to establish virtual circuits 330A-330B, PE routers 302 and 304 of IP/MPLS fabric 301 are configured with VRFs. PE 302 is configured with VRFs 402A and 404A, while PE 304 is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B. This configuration whereby a customer and/or sub-customer is able to access multiple layer 3 services from different CSPs each associated with separate VRFs to access the layer 3 services provides isolation of respective traffic exchanged with the CSPs. In some examples, PE 302 may be configured with a single VRF to import routes exported by both VRF 402B and VRF 404B. As noted above with respect to FIG. 3, PEs 302, 304 may be further configured to bridge layer 2 traffic between customer 308B, sub-customer 309B, and cloud service providers 320.

In this example, PE 304 operates BGP or other route distribution protocol peering connections 406B, 408B with respective PEs 312A, 312B to exchange routes with respective cloud service provider networks 320A, 320B. PE 302 operates a BGP or other route distribution protocol peering connection 410 with PE 310B to exchange routes with customer network 308B. In some examples, PEs 302, 304 may be statically configured with routes for the site networks.

An administrator or a programmable network platform described herein for cloud exchange point 303 may configure PEs 302, 304 with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302, 304 need access to the full Internet BGP routing table in order to reach cloud service provider networks 320 or customer networks 308. Moreover, PEs 302, 304 may be configured to aggregate customer/CSP routes and/or service traffic based on any one or more of physical, IP, service, and VRFs.

In accordance with the techniques of this disclosure, the ability for sub-customers 309B to access the cloud exchange may be enabled by providing multi-virtual routing and forwarding ("VRF") to cloud VRF consolidation for carrier simplification. For example, different sub-customers may be tied to different VRF instances, allowing for differentiation and isolation between sub-customers. In some cases, back-to-back VRF instances may be used.

Figure 5A:
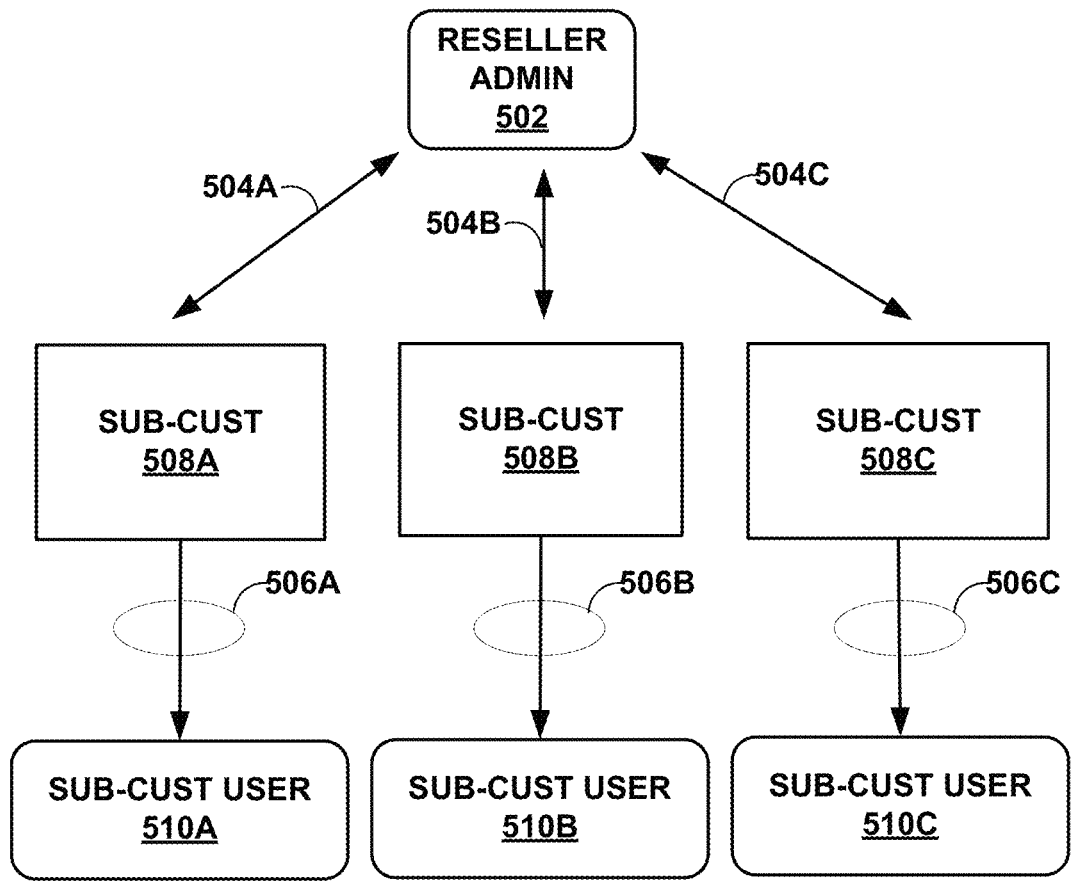
FIG. 5A-5B are conceptual diagrams illustrating examples of adding port level permissions to sub-customers of a cloud exchange, according to the techniques described herein.
Figure 5B:
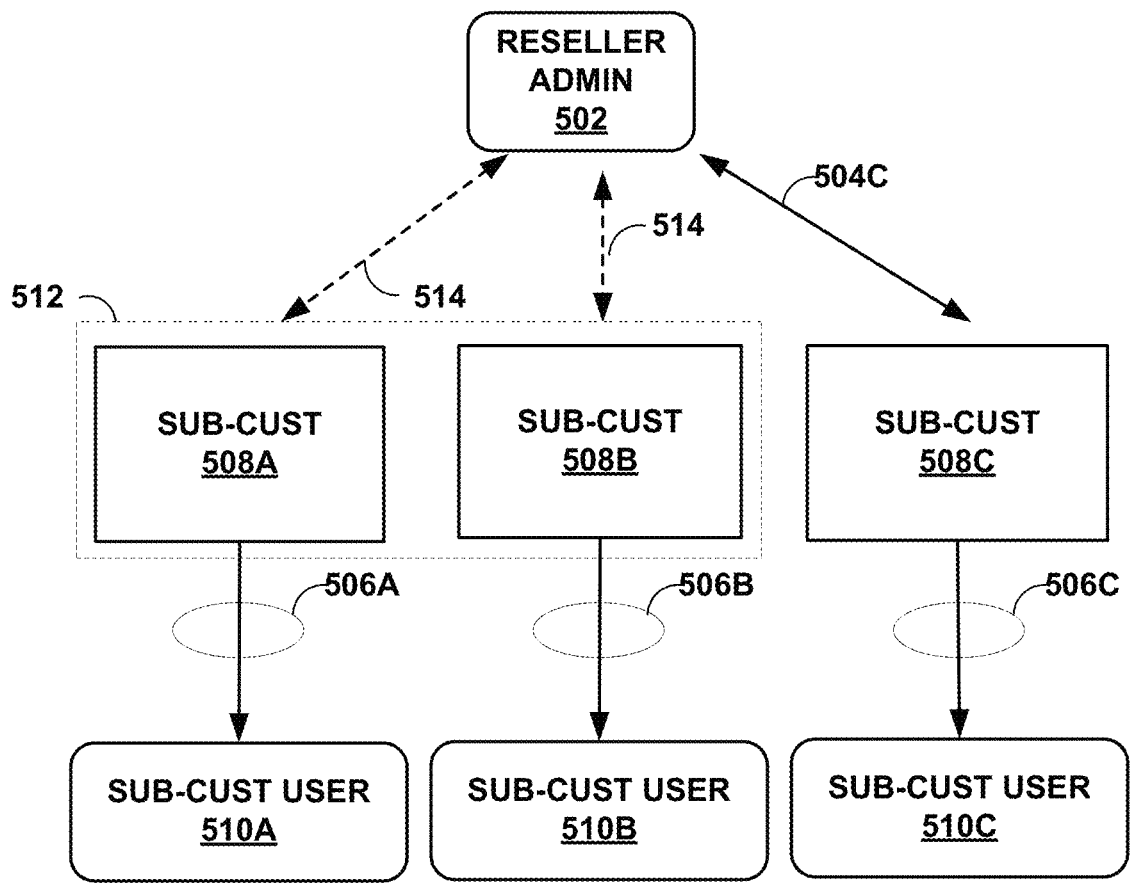

FIGS. 5A-5B are conceptual diagrams illustrating examples of adding port level permissions to sub-customers of a cloud exchange, according to the techniques described herein. In the example of FIG. 5A, reseller administrator 502 may have access to ports 504A-504C. Reseller administrator 502 may assign ports 504A-504C to sub-customer accounts 508A-508C (collectively, "sub-customer accounts 508"). For example, reseller administrator 502 may assign only port 504A to sub-customer account 508A. That is, only sub-customer account 508A has access to port 504A, and not to ports 504B, 504C. Reseller administrator 502 may define permissions 506A-506C (collectively, "permissions 506") only to the ports assigned to the sub-customer accounts 508. For example, reseller administrator 502 may define permission 506A for sub-customer user 510A to view and purchase connections to port 504A for which it is assigned. Based on permission 506A, sub-customer user 510A may view and/or purchase connections only from port 504A. In this way, a self-service environment is enabled for resellers to manage sub-customer accounts and permissions without requiring intervention by the cloud exchange provider.

In some examples, sub-customer users/types may include master agent, agent, value-added-reseller, accounts, account user, and/or account approver. In other examples, a plurality of agents and layers of agents may be associated to a single master. In examples where sub-customers may be assigned as sub-customer administrators, sub-customer administrators may create other sub-customer users. Likewise, many value-added-resellers may be associated with a single agent.

FIG. 5B describes another example of adding port level permission to sub-customers of a cloud exchange and is similar to FIG. 5A except as described below. In the example of FIG. 5B, where sub-customer accounts share the same cabinet 512, reseller administrator 502 may assign similar or different permissions to the same port for multiple sub-customer accounts 508. For example, sub-customer accounts 508A, 508B share the same cabinet 512 with port 514. The reseller administrator 502 may assign the same port 514 to sub-customer accounts 508A, 508B. Resellers 502 may then grant respective permissions 506A, 506B to the ports assigned to their accounts, e.g., port 514. For example, permission 506A may grant sub-customer 508A access to only view port 514 of cabinet 512, whereas permission 506B may grant sub-customer 508B access to view and order connections from port 514 of cabinet 512. In this way, sub-customer users 510A, 510B of sub-customer accounts 508A, 508B may access port 514 based on different permissions 506A, 506B.

Figure 6:
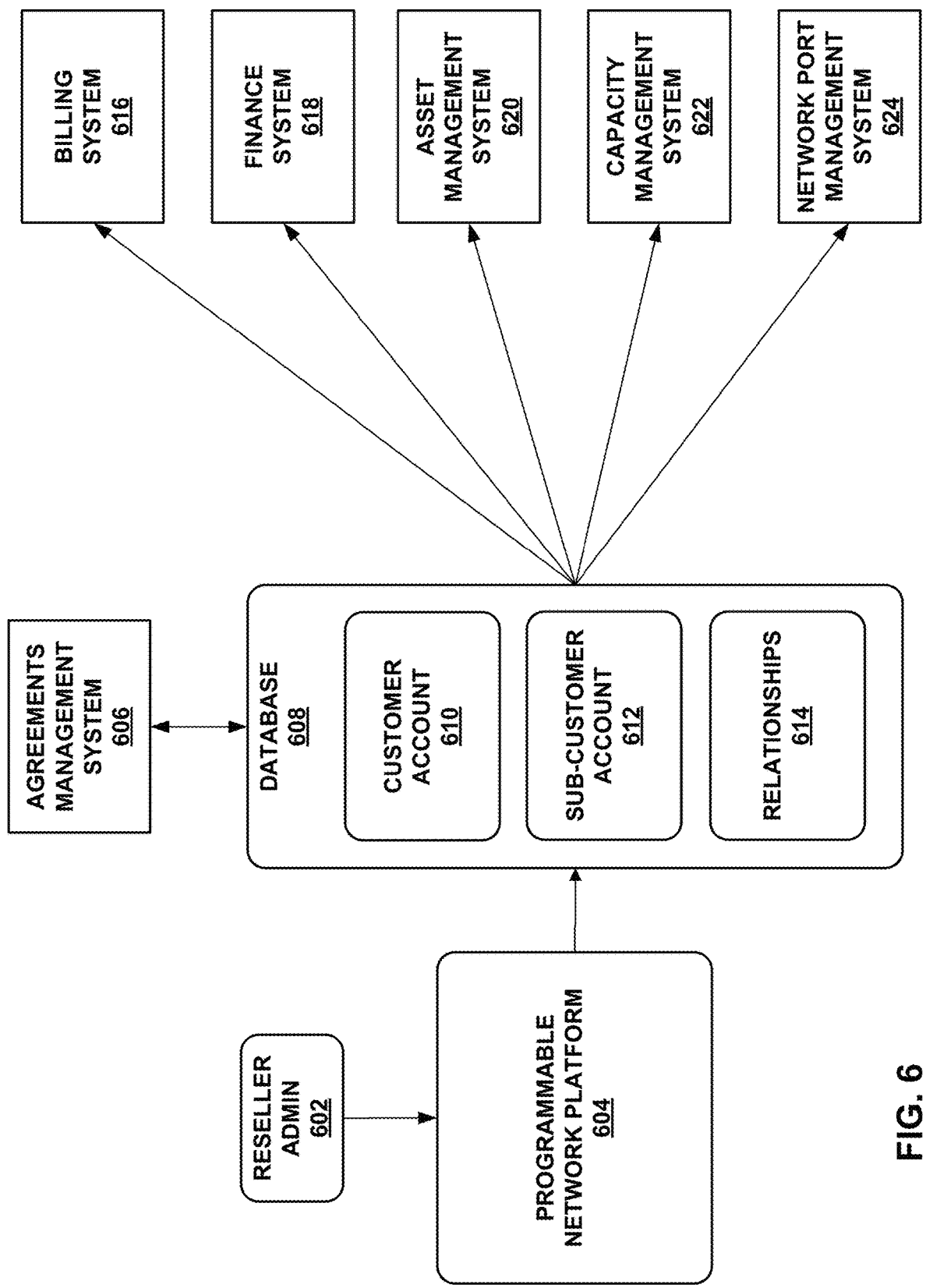
FIG. 6 is a block diagram illustrating an example of configuring customer and sub-customer accounts, in accordance with the techniques described in this disclosure.

FIG. 6 is a block diagram illustrating an example of configuring customer and sub-customer accounts, in accordance with the techniques described in this disclosure. Programmable network platform 604 of FIG. 6 is described with respect to programmable network platform 120 of FIG. 1. In the example of FIG. 6, a reseller administrator 602 may access a service interface, which invokes a programmable network platform 604 to establish relationships between customer accounts and sub-customer accounts. For example, programmable network platform 604 may push customer and sub-customer account details from the customer to database 608. Database 608 may include a data structure, or any suitable type of repository for storing data.

Database 608 may include, customer accounts 610, sub-customer accounts 612, and the relationships 614 between the customer and sub-customer accounts. For example, database 608 may store data fields with customer identifiers for customer accounts 610. Similarly, database 608 may store data field with sub-customer identifiers for sub-customer accounts 612.

The relationships 614 stored in database 608 may associate the customer and sub-customer identifiers based on relationship agreements between customer account 610 and sub-customer account 612. For example, a sub-customer may agree to receive services offered by a customer of the cloud exchange. Programmable network platform 604 may access agreement information from an agreements management system 606 and may create within database 608, data fields for relationships 614 to associate the identifiers for sub-customer accounts 612 and customer accounts 610. Programmable network platform 604 may publish the customer and sub-customer account details from database 608, including their relationships, to various systems, including billing system 616, finance system 618, asset management system 620, capacity management system 622, and/or network port management system 624.

Figure 7:
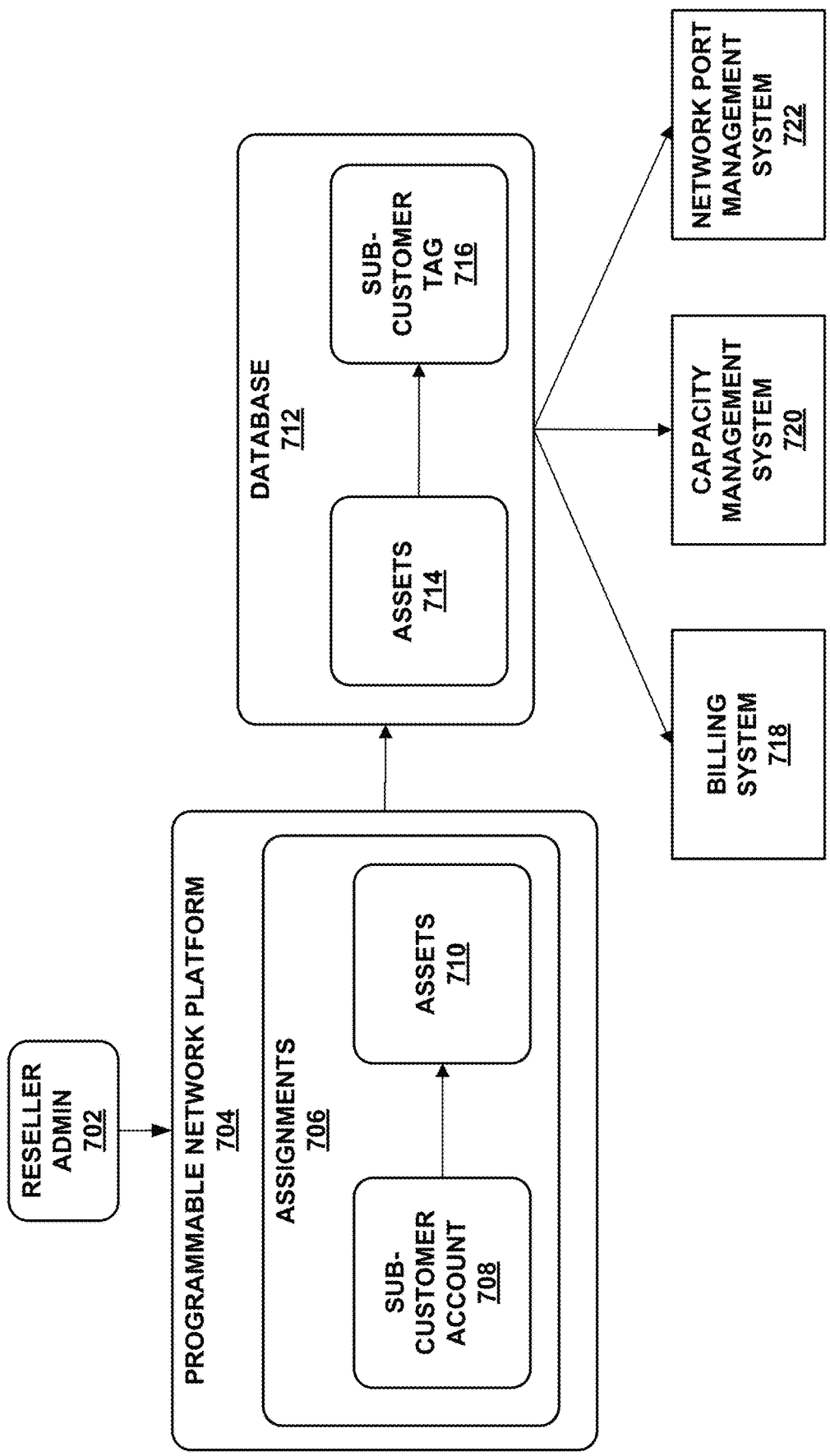
FIG. 7 is a block diagram illustrating an example of assigning assets for sub-customers, in accordance with the techniques described in this disclosure.

FIG. 7 is a block diagram illustrating an example of assigning assets for sub-customers, in accordance with the techniques described in this disclosure. Programmable network platform 704 of FIG. 7 is described with respect to programmable network platform 120 of FIG. 1. In the example of FIG. 7, a reseller administrator 702 may access a service interface, e.g., via a customer portal, which invokes programmable network platform 704 to assign permissions 706 for sub-customer accounts 708 to available assets 710. Based on assignment 706, sub-customer accounts may be "tagged" with the available assets in database 712. Database 712 may be a data structure, or any type of repository for storing data.

Database 712 may include asset records 714 that provide store permissions data for particular assets, including cages, cabinets, and ports. In the example of FIG. 7, database 712 may also include data fields for sub-customer tags 716. For example, database 712 may associate a sub-customer identifier with an asset record by adding the sub-customer identifier to a list of customer identifiers for customers or sub-customers that have permission to access the asset. In this way, an, asset record 714 may be modified by programmable network platform 704 to be "tagged" with a sub-customer tag 716 to identify the particular asset for which the sub-customer account has access.

Programmable network platform 704 may publish the asset tagging details from database 712, to various systems, including billing system 718, capacity management system 720, and/or network port management system 722. In this way, the various systems may identify the asset tagged for sub-customer access.

Figure 8:
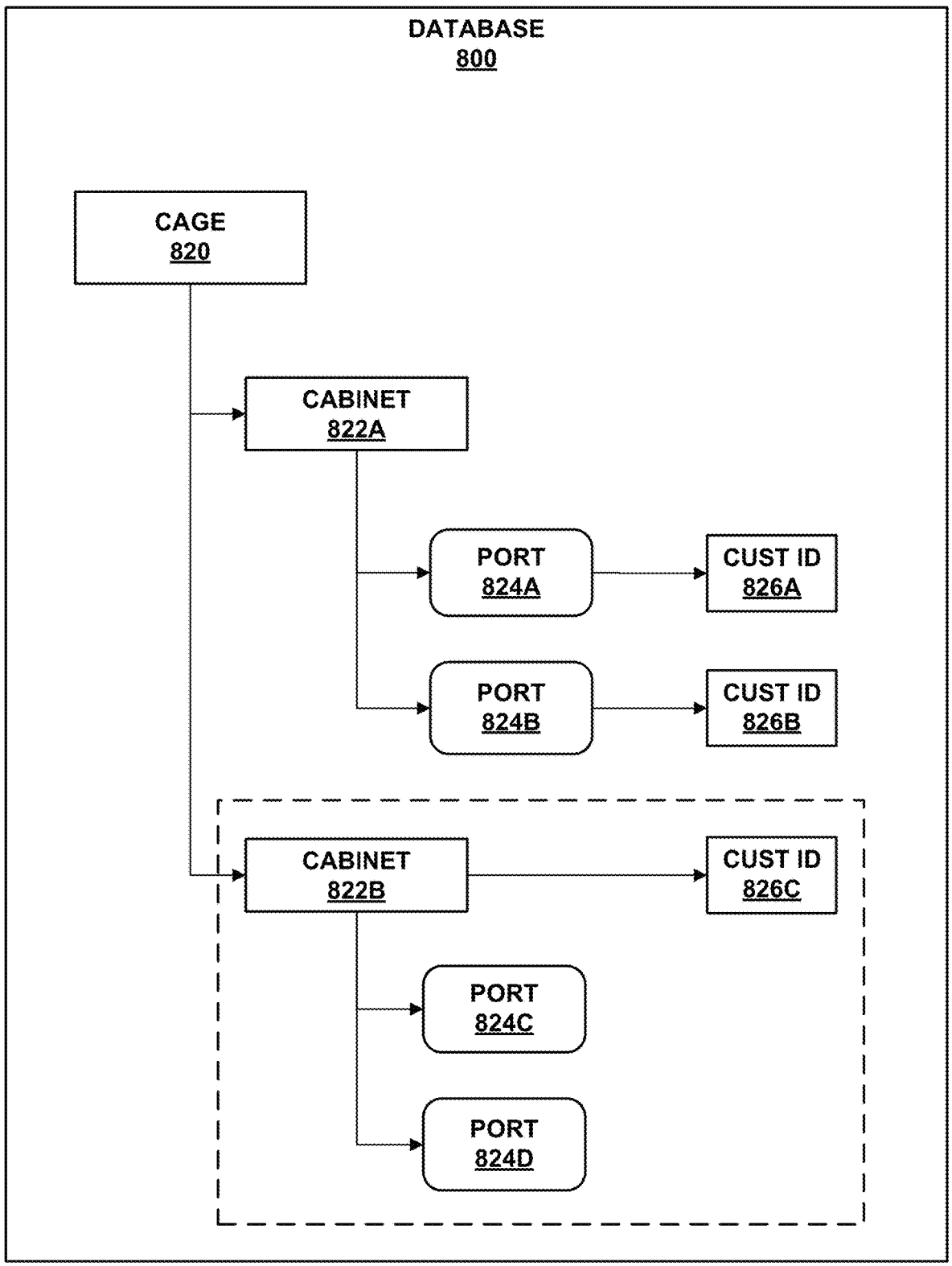
FIG. 8 is a block diagram illustrating an example of tagging assets in an asset hierarchy for a network service provider, in accordance with the techniques described in this disclosure.

FIG. 8 is a block diagram illustrating an example of tagging assets in an asset hierarchy for a network service provider, in accordance with the techniques described in this disclosure. Database 800 of FIG. 8 illustrates an example implementation for the tagging of assets in database 712 of FIG. 7 in more detail.

In this example asset hierarchy, database 800 may include asset records that provide store permissions data for particular assets. For example, database 800 may include data fields representing a cage 820, cabinets 822A-822B (collectively, "cabinets 822") within cage 820, ports 824A-826D within corresponding cabinets 822, and sub-customer identifiers 826A-826C. As described above, a reseller administrator may define permissions for particular sub-customers to view and/or order particular assets (e.g., cabinets, ports, etc.) available through the reseller. To associate sub-customers with the defined permissions, assets are "tagged" with customer identifications 826A-826C (collectively, "customer IDs 826") that represent respective sub-customers, for example.

In one example, a reseller administrator may access a service interface for the programmable network platform to define permissions for a sub-customer associated with customer ID 826A to view a port associated with port 824A despite port 824A being assigned as an asset of a customer that is not the sub-customer associated with customer ID 826A. Database 800 may associate the data field for customer ID 826A with the data field for port 824A such that the sub-customer associated with customer ID 826A may view the port associated with port 824A.

Similarly, the reseller administrator may access the service interface for the programmable network platform to define different permissions for a sub-customer associated with customer ID 826B to view and order connections from a port associated with port 824B. Database 800 may associate the data field for customer ID 826B with the data field for port 624B such that the sub-customer associated with customer ID 826B may view and purchase connections from the port associated with port 824B. That is, the sub-customers may be configured with different permissions to access particular assets. In some examples, a single port may be tagged with multiple sub-customer identifiers to define permissions for the multiple sub-customers for accessing the single port.

In some examples, the reseller administrator may access the service interface for the programmable network platform to define permissions for a sub-customer associated with customer ID 826C to view and purchase connections from a cabinet associated with cabinet 822B. Database 800 may associate the data field for customer ID 826C with the data field for cabinet 822B such that the sub-customer associated with customer ID 826C may view and purchase connections from the cabinet associated with cabinet 822C. By tagging cabinet 822B with customer ID 826C, customer ID 826C may, in some examples, be inherently associated with ports 824C and 824D.

Figure 9A:
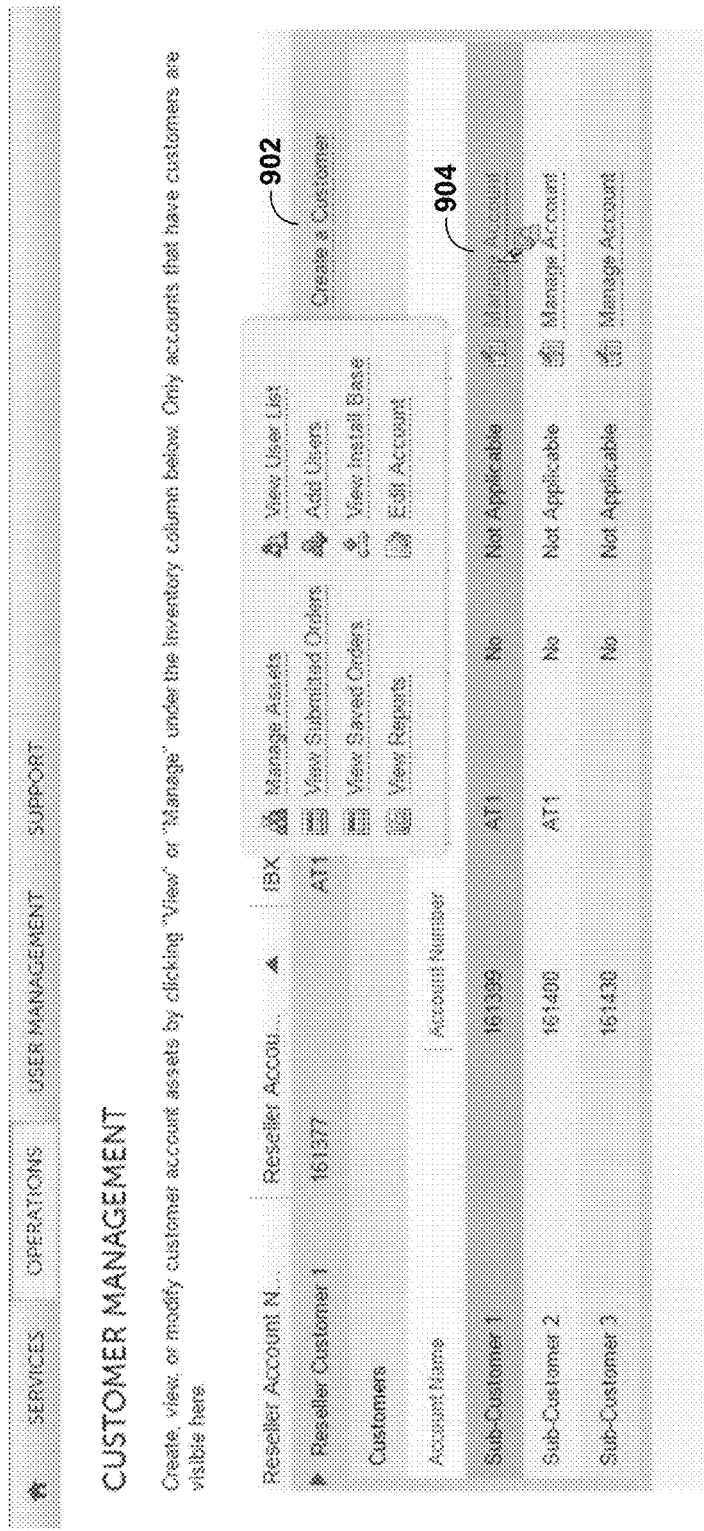

FIGS. 9A-9G illustrate example interfaces presented via a portal of programmable network platform that enables reseller configuration of assets and user permissions for sub-customer access to assets of a cloud-based service exchange ("cloud exchange") network. For example, FIG. 9A illustrates an interface 900 by which a reseller administrator may view and manage the sub-customers of a reseller account, including information on cloud exchange, billing, and inventory. The example interface 900 of FIG. 9A further enables the reseller administrator to create a sub-customer 902 and manage the account 904 for the sub-customer. Selection of "Create a Customer" presents another interface (as further described below in FIG. 9B) by which the administrator may create a new sub-customer account (e.g., the sub-customer account 508 in FIGS. 5A, 5B) such that the reseller administrator may be able to assign assets to the sub-customer. Selection of "Manage Account" presents an interface by which the administrator may manage assets (as further described below in FIG. 9C), view submitted orders, view saved orders, view reports, view a sub-customer user list, add sub-customer users, view install base, and/or edit sub-customer accounts. As shown in FIG. 9A, the management of accounts pertains to sub-customers defined by the reseller.

The example interface in FIG. 9B presents an interface 910 by which a reseller administrator may create a new sub-customer account to consumer services provided by the reseller's assets in the cloud exchange. For example, reseller administrator may create a new customer, assign a reseller account name/number 912, configure a billing type 914 (even if sub-customer is not a current tenant of the cloud exchange), and configure details 916, such as an address associated with the new sub-customer. This way, a sub-customer may consume services on behalf of the reseller and be billed for the services even though the sub-customer is not a tenant of the cloud exchange. The reseller account number is defined to associate the sub-customer to a particular reseller. This is because sub-customers may be associated with more than one reseller. The reseller account number may also be defined such that reseller operations can search individual customer environments across multiple cloud exchanges. In other examples, sub-customers may also be associated with non-reseller accounts within the cloud exchange. The billing type may include billable and/or non-billable sub-customer accounts. For non-billable sub-customer, an invoice is generated against the reseller with a grouping of sub-customer lines, and credit checks are done against the reseller account. For a billable sub-customer, the invoice is generated against the sub-customer, and credit checks are done against both sub-customer account and the reseller account.

Figure 9C:
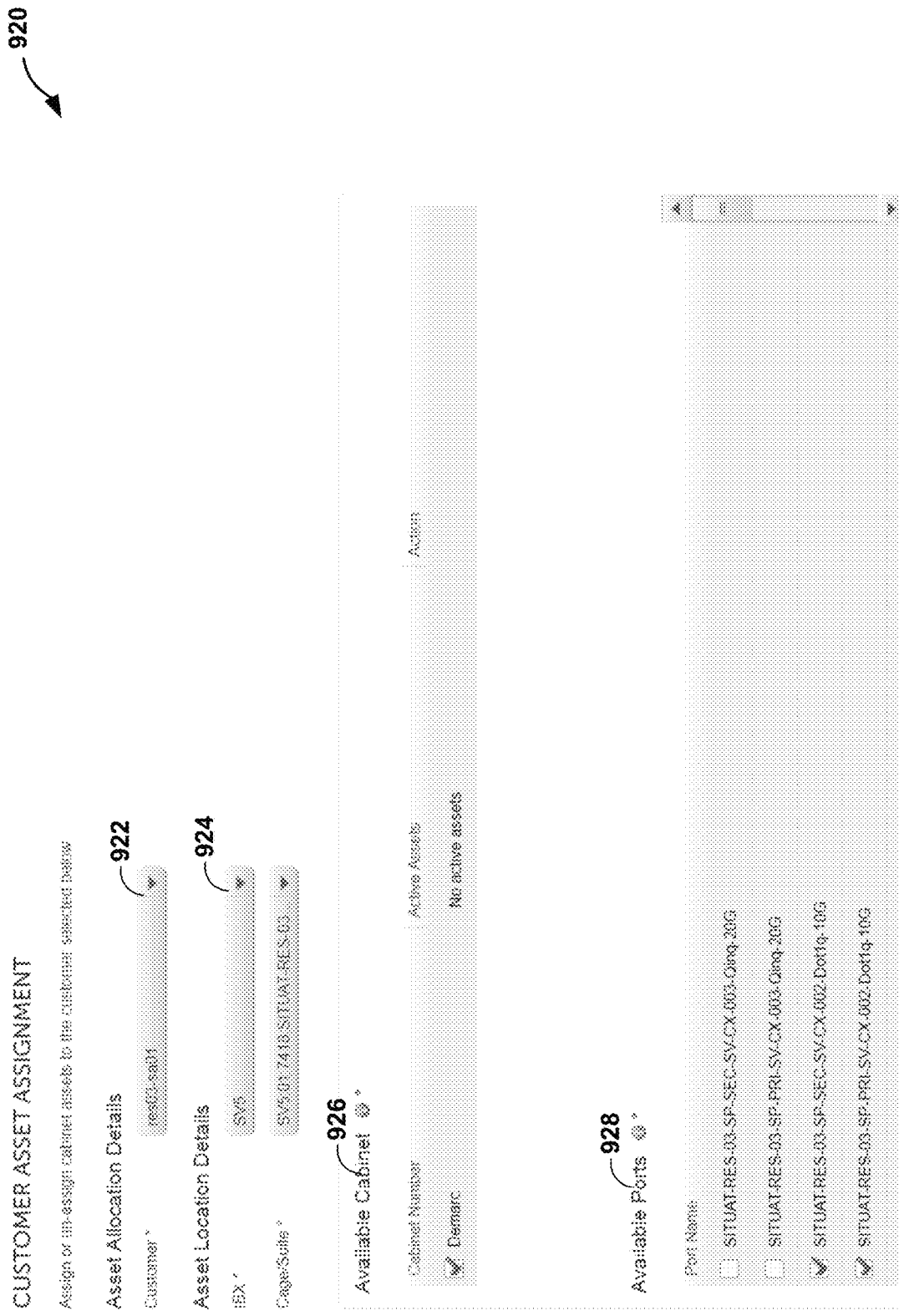

In the example of FIG. 9C, the "CUSTOMER ASSET ASSIGNMENT" interface 920 presents an interface by which a reseller administrator may configure asset allocation details for a particular sub-customer 922, asset location details 924, including cloud exchange and cage/suite information, and available cabinets 926 and ports 928. For example, the reseller administrator may manage asset permissions for "res03-sa01" for location "SV5" of cage "SV5: 01:7418:SITUAT-RES-03." Within "SV5" and cage "SV5: 01:7418:SITUAT-RES-03," cabinet "Demarc" is presented as the available cabinet by which a reseller administrator may configure permissions for sub-customer users to access. Resellers may select particular cabinets such that sub-customer "res03-sa01" may have access based on reseller defined permissions. In response to the resellers selections, the sub-customer's access of particular assets are restricted based on the permissions.

Available ports of the reseller may also be presented such that the reseller administrator may configure permissions to those ports for sub-customers to access. For example, each cabinet (e.g., "Demarc") may further display available ports 928 within each cabinet, and may further include a patch panel with one or more ports. As further described in FIG. 9E, the reseller administrator may also configure permissions for these ports, such as to enable sub-customer users to view the ports and virtual circuit and/or order virtual circuits and/or services such as cross-connect, smart hands, scheduled services, trouble tickets, etc. Cabinets that have been assigned to the sub-customer would generally have active sub-customer assets within, and the sub-customer would need to have the ability to request these services to support assets they possess. The following are examples of services that may be available to sub-customers once permissions are granted. Cross connect service enables sub-customers to connect with service providers or to other assets within the cloud exchange. Smart hands service enables cloud exchange provider technicians to be dispatched to the cabinet/port to perform billable services for which the reseller would bill the sub-customer. Scheduled services enables sub-customers to request work visits, i.e., temporary access, to conference rooms, tours or hand scans (for permanent cage/cabinet access). Trouble tickets service enable sub-customers to raise a ticket to notify the cloud exchange provider of a service impacting event, such as power loss, heating, ventilating, and air conditioning (HVAC) issues, etc. In this way, resellers may manage asset permissions at port-level for sub-customer users in a cloud exchange. This allows administrators of the resellers to assign permissions to sub-customer users so they may self-serve. For sub-customers of resellers, once assets have been assigned, the sub-customers' users may order against those assets if the users have been given ordering permissions by either the Reseller Master administrators or the Sub-Customer administrators enabled by the reseller.

Figure 9D:
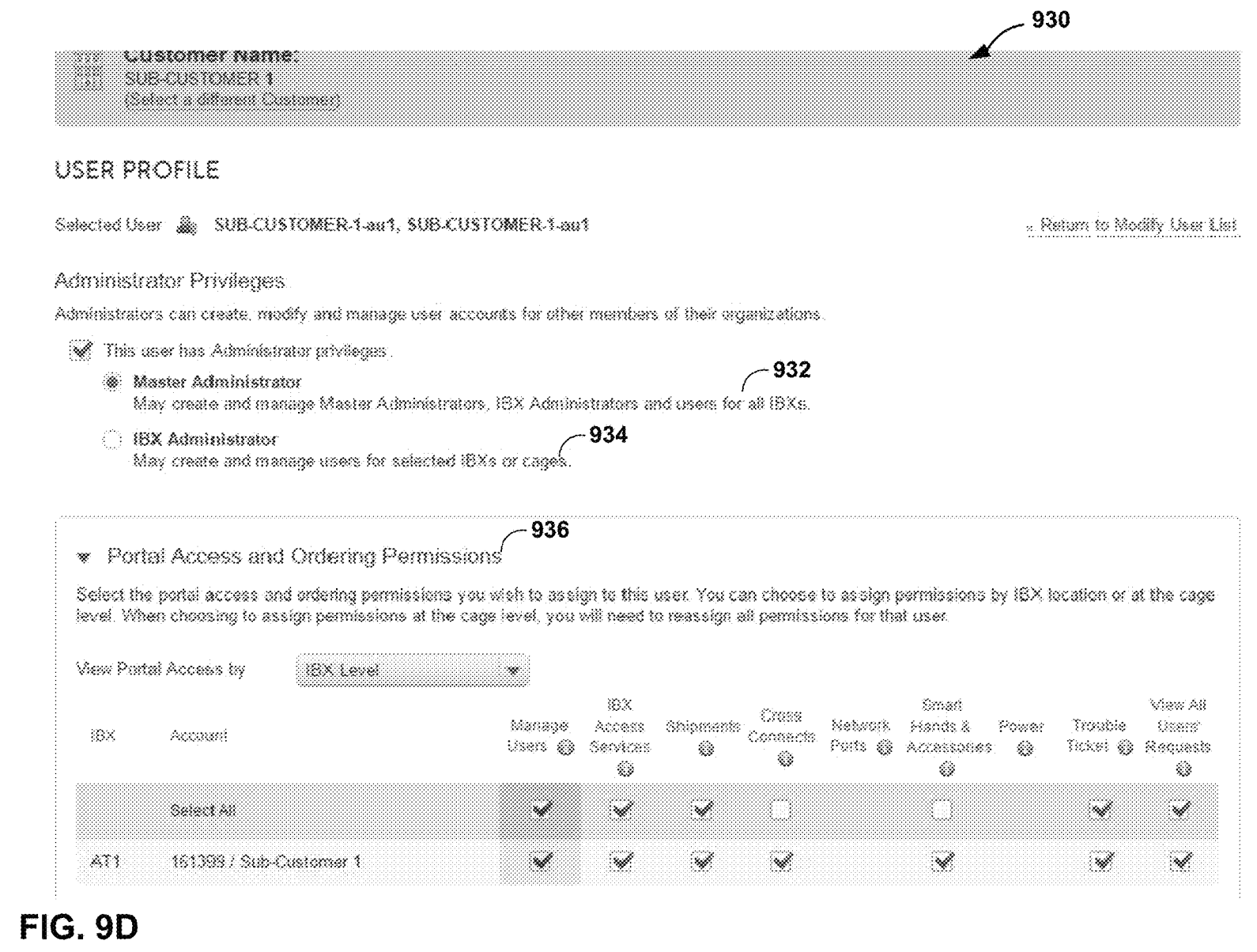

FIG. 9D is an example of an interface 930 by which a reseller administrator may configure portal access and ordering permissions for particular sub-customers. For example, once particular assets are assigned to particular sub-customers, the reseller administrator may configure sub-customer access to the portal and ordering permissions. Reseller administrator may also configure the sub-customer to have administrator privileges. For example, reseller administrator may configure a sub-customer as a master administrator 932 such that the sub-customer may create and manage master administrators, cloud exchange administrators, and users for all cloud exchanges. Reseller administrator may also configure the sub-customer as a cloud exchange administrator 934 such that the sub-customer may create and manage users for selected cloud exchanges or cages. This includes the ability for the sub-customer as a cloud exchange administrator to manage individual sub-customer end user accounts. In some examples, the administrative privileges may be grouped by roles/profiles such that the roles/profiles have a subset of administrative privileges.

The portal and ordering permissions 936 may include the management of users, cloud exchange access services, shipments, cross connects, network ports, smart hands and accessories (e.g., sub-customers may request cloud exchange provider technicians to be dispatched to the cabinet to perform billable services for which the reseller would bill the sub-customers), power, trouble ticket (e.g., sub-customer may generate a ticket for services experiencing an event), and view all user requests. In some examples, resellers may delegate ordering services, e.g., enabling sub-customer to order Smart Hands, but not order cross-connects).

Although not shown, the reseller administrator may configure cloud exchange data center access (e.g., cage access, remove equipment, bring guests, etc.), view of full details and export reports for assets purchased, view billing and payment statements, enable sub-customer to receive data center and network notifications, enable portal role and permissions, view ports of other customers, and/or configure cloud exchange portal permissions (as shown in FIG. 6). Although the reseller may configure the sub-customer with administrative privileges, the reseller may also order services within the sub-customer port and/or create connections with the sub-customer port on the sub-customer's behalf.

FIG. 9E is an example of an interface 940 by which reseller administrator may configure portal access and ordering permissions or network port connections and services. An administrator of a reseller can access the cloud exchange portal permissions user interface 940 via the customer portal to select the cloud exchange portal roles and permissions for a user, including the ability to grant port level permissions to cloud exchange platform users. In the example of FIG. 9E, an administrator of the cloud exchange portal permissions 940 may select individual ports to grant permissions to enable a sub-customer user to have cloud exchange portal access 944 and/or enable the sub-customer user to view and/or place connection and service orders for the selected ports. For example, an administrator's selection of cloud exchange portal access 942 grants a sub-customer user access to the cloud exchange portal permissions interface 940 such that the sub-customer user may have stand-alone access to view and/or order assets. In this way, sub-customer administrators may assign permissions to sub-customer users only if the sub-customer account of that sub-customer user has the ports assigned to the sub-customer account. An administrator's selection to view all current and future ports, connections and services 944 automatically selects and enables all ports of each location, thereby granting the sub-customer user permission to view all ports and virtual circuits for all locations and ports. An administrator's selection to place connection and service orders for all current and future ports 945 automatically selects and enables all current and future ports of each location, thereby granting the sub-customer user permission to place orders for all ports and virtual circuits for all locations and ports. Alternatively, as further described below, the administrator may configure individual ports and virtual circuits for sub-customer users to view 948.

In the example of FIG. 9E, the cloud exchange portal permissions 940 may enable an administrator to configure permissions for each port 947 by location 946. Within each location 946, the cloud exchange portal permissions interface 940 may provide particular ports 947 within each location 946. In the example of FIG. 9E, location "SV1" may include "Equinix-SV1-EEE-01," "Equinix-IT-SV1-CX-SEC-01," and "dxcon-fgptdigg," and location "SV5" may include "Equinix-IT-SVS-CX-PRI-01" and "dxcon-fgsm16i3" which indicate the ports previously assigned by the reseller administrator. The administrator may select the individual ports to configure permissions for each of the particular ports; such as to view ports and virtual circuits 948 and/or to place port and virtual circuit orders 949. As shown in the example of FIG. 9E, administrator may grant a sub-customer user permission to view ports and virtual circuits only for certain ports from specific locations. Following the above configuration, sub-customer users may only access ports that were selected.

The administrator may also select individual ports to grant permission for sub-customers of the sub-customer accounts to place connection and service orders for each port 949. Using the example above, resellers may select "Equinix-SV1-EEE-01" to permit sub-customers to view and order connection and service orders. In this way, cloud exchange portal permissions 940 enables sub-customers to establish a cloud service delivery network through reseller assets.

FIG. 9F is an example of an interface 950 by which reseller and/or sub-customer may track products and services that sub-customer users have purchased. Programmable network platform may provide tracking to report sub-customer activities. The activities tracked may include ongoing work and purchases of sub-customers, notification history, maintenance incidents, and asset inventory assigned the sub-customer. In the example of FIG. 9F, the programmable network platform may track sub-customer 952 ("Reseller Customer 1") purchase of cabinet 954 ("cabl-20096800") within location (e.g., cage) 956 ("AT1:02: NAM208"). The tracked activity may also include all revenue associated to a particular sub-customer or an individual reseller.

Figure 9G:
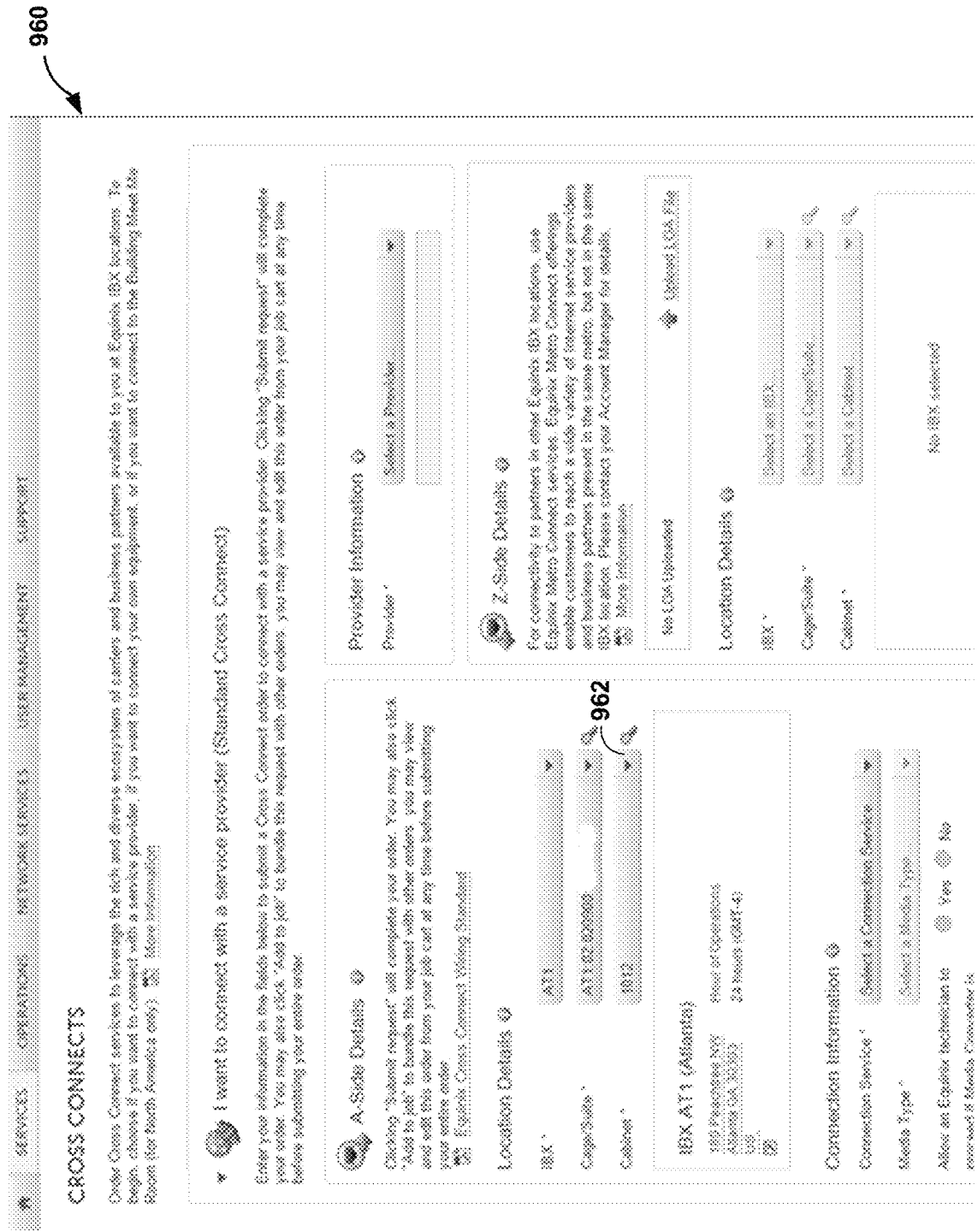

FIG. 9G is an example of an interface 960 by which a sub-customer may order services. In the example of FIG. 9G, sub-customer may order Cross Connects only for assigned cabinet "1012" (as assigned by reseller) 962. Although the interface is shown with respect to cross connects, the sub-customer may access additional interfaces to order Smart Hands, Scheduled Services, Trouble Tickets, and other services for the asset.

Figure 10:
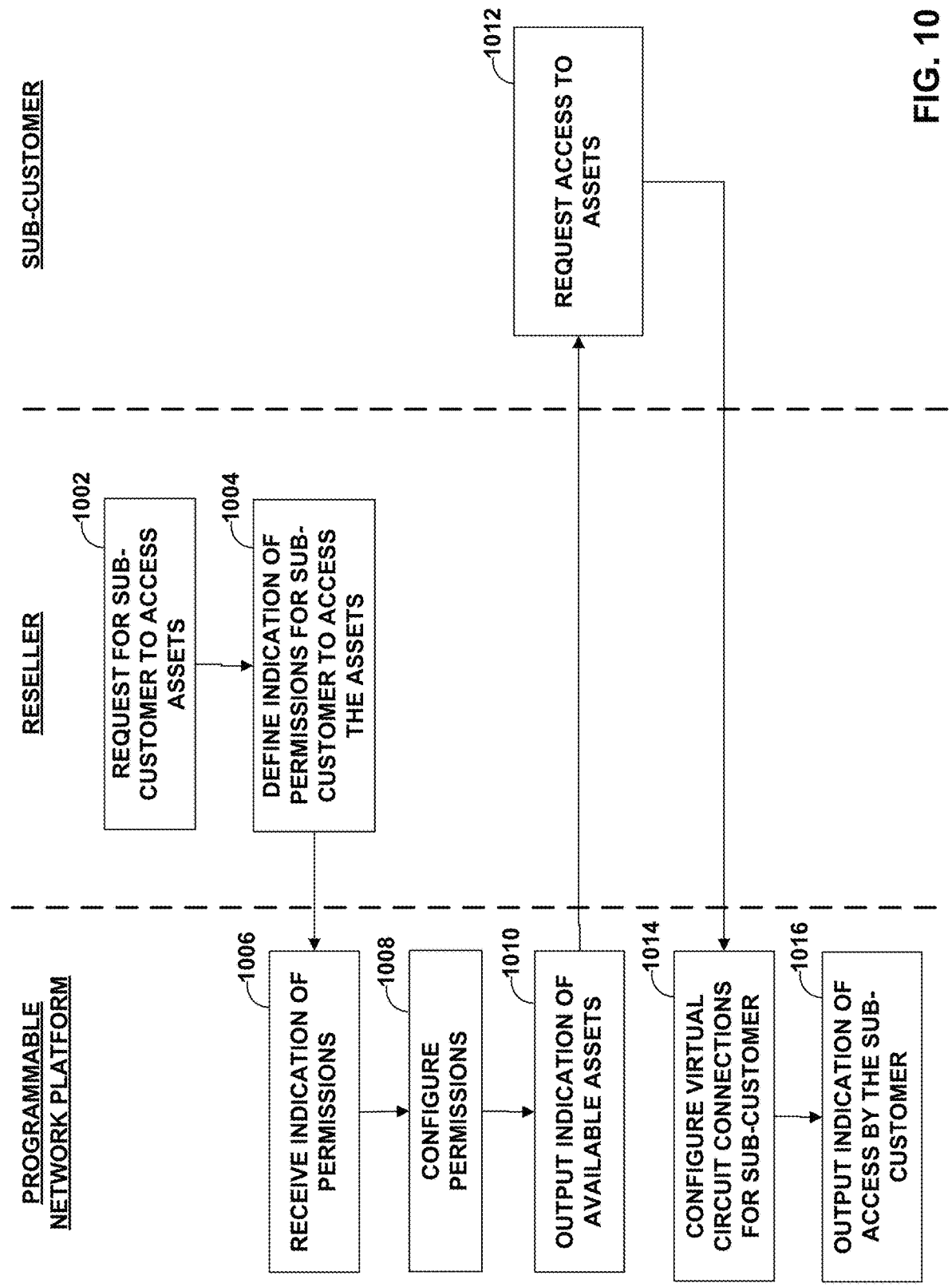
FIG. 10 illustrates a flowchart showing an example process for management of sub-customer permissions for assets in a cloud exchange, according to the techniques described herein.

FIG. 10 illustrates a flowchart showing an example process for management of sub-customer permissions for assets in a cloud exchange, according to the techniques described herein. A customer/reseller may order virtual circuit connections to assets (e.g., cage, cabinet, port, etc.) from a cloud exchange provider. In response to receiving the asset orders (e.g., via a customer portal application), a programmable network platform of a cloud exchange provider may configure virtual circuit connections for the customer/reseller. For example, the programmable network platform may configure layer 3 virtual circuits, established within cloud exchange points, to interconnect a cloud service provider networks to NSP networks and customer/reseller networks.

A customer of a cloud exchange may then become a reseller of its assets in the cloud exchange. For example, the customer may submit, via a customer portal to the programmable network platform, a request for a sub-customer to access the assets assigned to the customer (1002). For example, a customer/reseller may select, via the portal, particular sub-customers to view and/or order virtual circuit connections to assets assigned to the customer/reseller. The reseller may define permissions, via the portal, that permit a sub-customer certain rights to access the assets (1004). For example, the programmable network platform may provide an interface for a reseller to view current and future ports and connections that are assigned to the reseller. For instance, reseller may, for each customer, select via the interface which of the reseller's assets to assign to a sub-customer. In some examples, reseller may assign multiple sub-customers per asset. For example, a reseller may define permissions for an aggregation of sub-customer accounts such that the reseller may effectively manage a single aggregate account rather than the individual sub-customer accounts. For example, the reseller may configure permissions for the sub-customer to view at least a port, a connection, and/or a service from the one or more tagged assets. The reseller may further configure permissions for the sub-customer to order at least a connection and/or a service from the tagged assets.

The programmable network platform of cloud exchange provider may receive an indication of the permission for the sub-customer for accessing the assets via the programmable network platform (1006). The programmable network platform may, based on the received indication, configure permissions for the assets to enable the sub-customer to access the assets (1008). For example, a database for the programmable network platform may include store permissions data that may associate a sub-customer identifier with an asset record. Programmable network platform may configure modify the asset record to be "tagged" with a sub-customer tag to identify the particular asset. The tag may enable programmable network platform to associate the particular asset with the sub-customer such that the sub-customer may be given access to the particular asset. In other words, programmable network platform may push the associated asset records to various systems (e.g., network port management system) such that when a sub-customer accesses the customer portal, the sub-customer may view and/or order the assets it is permitted to access.

Dependent upon the permissions, programmable network platform may output an indication of available assets for the sub-customer (1010). A sub-customer may access the customer portal of programmable network platform and request access to the available assets (1012). For example, the sub-customer may place a request via the portal to view and/or order virtual circuit connections to the assets. In some examples, the reseller may place orders on behalf of the sub-customer, pending sub-customer approval. For example, a reseller may have access to a sub-customer account and may order virtual connections to the assets on behalf of the sub-customer. Orders made on behalf of sub-customers may be presented as a group or individually for sub-customer approval. In some examples, the sub-customer may also elect to automatically approve all orders made by the reseller.

Based on the order, programmable network platform may configure virtual circuit connections for the sub-customer (1014). For example, programmable network platform may identify from the database a tag between data fields for the sub-customer and an asset. The programmable network platform may then assign layer 3 virtual circuits previously established for that asset such that the sub-customer may also interconnect with cloud service provider networks.

Programmable network platform may output an indication of access by the sub-customer to the assets (1016). For example, programmable network platform may output user interface data for display by the customer portal for the co-location facility. The user interface data may indicate access by the sub-customer to the assets available in the colocation facility. The user-interface data may indicate the sub-customer is enabled to select an asset (e.g., port) for an interconnection for the customer. When a sub-customer uses the ordered assets, the sub-customer may access the customer portal as if the sub-customer was a customer of the cloud exchange provider. Resellers may also receive reports including details and/or confirmation of sub-customer activities. For example, the reports may include all current reporting and visibility to determine what is currently shown versus what reseller would like to be visible to the sub-customers (e.g., displaying services and not the price when directly ordering services).

Figure 11:
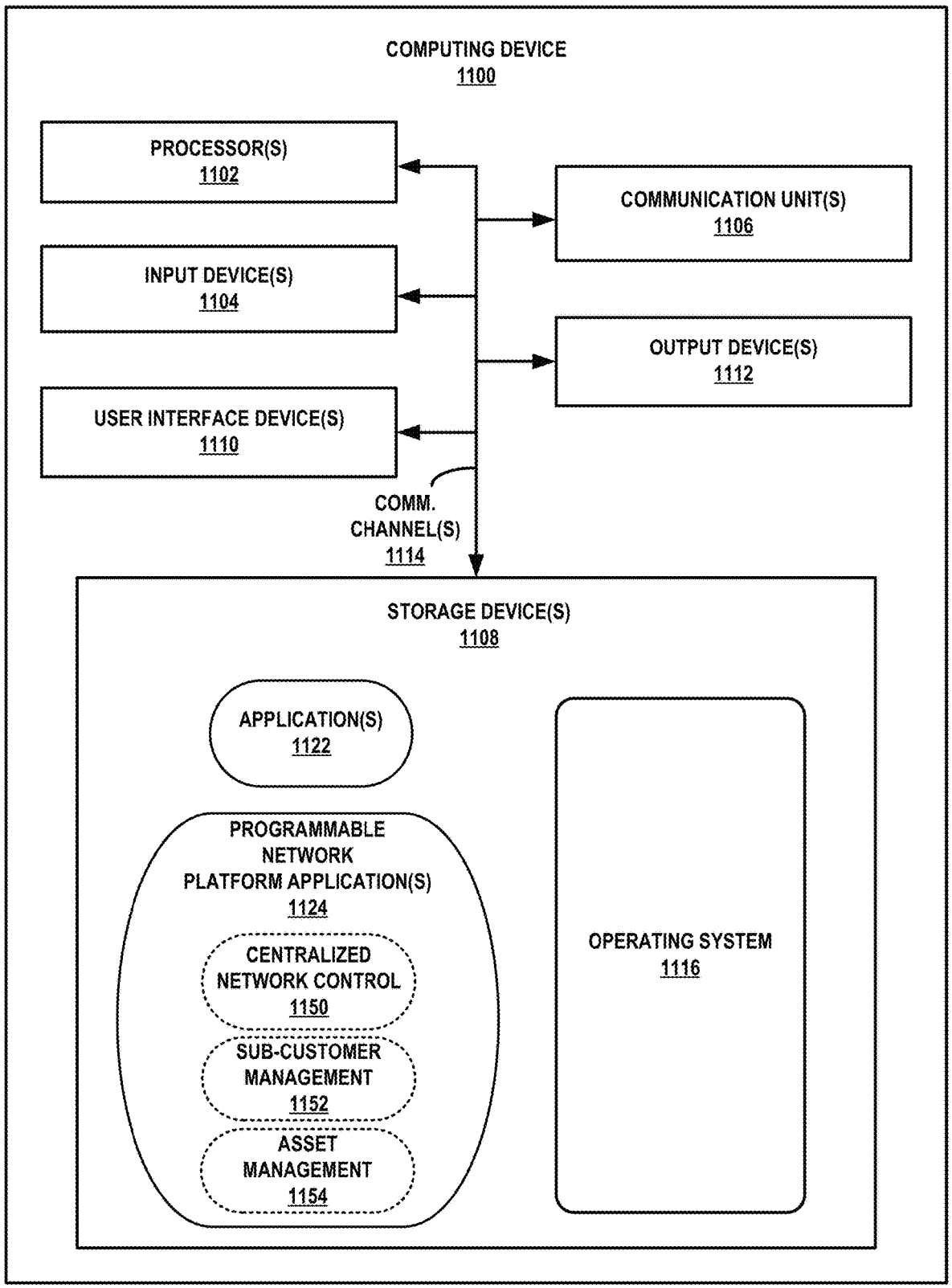
FIG. 11 is a block diagram illustrating further details of one example of a computing device that operates in accordance with one or more techniques of the present disclosure.

FIG. 11 is a block diagram illustrating further details of one example of a computing device that operates in accordance with one or more techniques of the present disclosure. FIG. 11 may illustrate a particular example of a server or other computing device 1100 that includes one or more processor(s) 1102 for executing any one or more of the programmable network platform components (e.g., CNC, NFU, etc.), or any other system, application, or module described herein. Other examples of computing device 1100 may be used in other instances. Although shown in FIG. 11 as a stand-alone computing device 1100 for purposes of example, a computing device may be any component or system that includes one or more processors or other suitable computing environment for executing software instructions and, for example, need not necessarily include one or more elements shown in FIG. 11 (e.g., communication units 1106; and in some examples components such as storage device(s) 1108 may not be co-located or in the same chassis as other components).

As shown in the specific example of FIG. 11, computing device 1100 includes one or more processors 1102, one or more input devices 1104, one or more communication units 1106, one or more output devices 1112, one or more storage devices 1108, and user interface (UI) device 1110, and communication unit 1106. Computing device 1100, in one example, further includes one or more applications 1122, programmable network platform application(s) 1124, and operating system 1116 that are executable by computing device 1100. Each of components 1102, 1104, 1106, 1108, 1110, and 1112 are coupled (physically, communicatively, and/or operatively) for inter-component communications. In some examples, communication channels 1114 may include a system bus, a network connection, an inter-process communication data structure, or any other method for communicating data. As one example, components 1102, 1104, 1106, 1108, 1110, and 1112 may be coupled by one or more communication channels 1114. Programmable network platform application(s) 1124 may correspond to programmable network platform 120 of FIGS. 1-4, for example.

Processors 1102, in one example, are configured to implement functionality and/or process instructions for execution within computing device 1100. For example, processors 1102 may be capable of processing instructions stored in storage device 1108. Examples of processors 1102 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1108 may be configured to store information within computing device 1100 during operation. Storage device 1108, in some examples, is described as a computer-readable storage medium. In some examples, storage device 1108 is a temporary memory, meaning that a primary purpose of storage device 1108 is not long-term storage. Storage device 1108, in some examples, is described as a volatile memory, meaning that storage device 1108 does not maintain stored contents when the computer is turned off. Examples of volatile memories include random access memories (RAM), dynamic random access memories (DRAM), static random access memories (SRAM), and other forms of volatile memories known in the art. In some examples, storage device 1108 is used to store program instructions for execution by processors 1102. Storage device 1108, in one example, is used by software or applications running on computing device 1100 to temporarily store information during program execution.

Storage devices 1108, in some examples, also include one or more computer-readable storage media. Storage devices 1108 may be configured to store larger amounts of information than volatile memory. Storage devices 1108 may further be configured for long-term storage of information. In some examples, storage devices 1108 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1100, in some examples, also includes one or more communication units 1106. Computing device 1100, in one example, utilizes communication units 1106 to communicate with external devices via one or more networks, such as one or more wired/wireless/mobile networks. Communication units 1106 may include a network interface card, such as an Ethernet card, an optical transceiver, a radio frequency transceiver, or any other type of device that can send and receive information. In some examples, computing device 1100 uses communication unit 1106 to communicate with an external device.

Computing device 1100, in one example, also includes one or more user interface devices 1110. User interface devices 1110, in some examples, are configured to receive input from a user through tactile, audio, or video feedback. Examples of user interface devices(s) 1110 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1112 may also be included in computing device 1100. Output device 1112, in some examples, is configured to provide output to a user using tactile, audio, or video stimuli. Output device 1112, in one example, includes a presence-sensitive display, a sound card, a video graphics adapter card, or any other type of device for converting a signal into an appropriate form understandable to humans or machines. Additional examples of output device 1112 include a speaker, a cathode ray tube (CRT) monitor, a liquid crystal display (LCD), or any other type of device that can generate intelligible output to a user.

Computing device 1100 may include operating system 1116. Operating system 1116, in some examples, controls the operation of components of computing device 1100. For example, operating system 1116, in one example, facilitates the communication of one or more applications 1122 and programmable network platform application(s) 1124 with processors 1102, communication unit 1106, storage device 1108, input device 1104, user interface devices 1110, and output device 1112.

Application 1122 and programmable network platform application(s) 1124 may also include program instructions and/or data that are executable by computing device 1100. Example programmable network platform application(s) 1124 executable by computing device 1100 may include any one or more of centralized network control application 1150, sub-customer management module 1152, and asset management module 1154, each illustrated with dashed lines to indicate that these may or may not be executable by any given example of computing device 1100.

Centralized network control 1150 may include instructions for causing computing device 1100 to perform one or more of the operations and actions described in the present disclosure with respect to centralized network control. As one example, CNC 1150 may include instructions that cause computing device 1100 to establish, de-install and manage interconnections with multiple, different cloud service providers participating in the cloud exchange in an automated and seamless manner.

Sub-customer management module 1152 may include instructions for causing computing device 1100 to perform one or more of the operations and actions described in the present disclosure with respect to sub-customer permissions, asset-assignment, and management. As one example, sub-customer management module 1152 may include instructions that cause computing device 1100 to receive requests or instructions from a reseller executing on another server, e.g., in a different geographically location such as a different data center, to configure network infrastructure of a cloud exchange point in order to provision one or more services.

Asset management module 1154 may include instructions for causing computing device 1100 to perform one or more of the operations and actions described in this disclosure with respect to tagging asset identifiers with sub-customer identification in a database to enable sub-customer permissions, asset-assignment, and management to the tagged assets. As one example, asset management module 1154 may include instructions that cause computing device 1100 to access and manipulate sub-customer identification and asset information in the database such that sub-customer identification may be associated with a particular asset identification.

Figure 12:
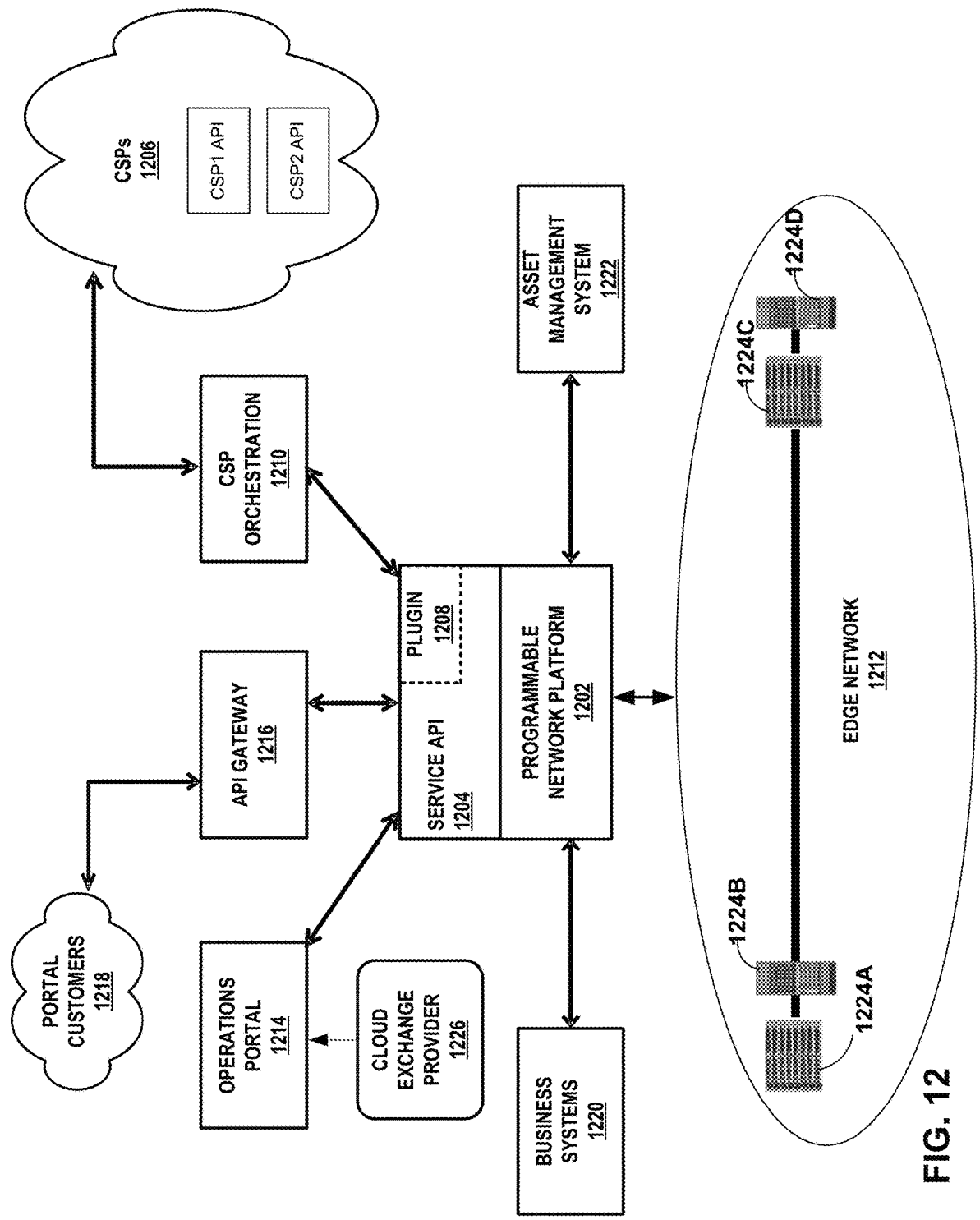
FIG. 12 is a block diagram illustrating a programmable network platform that includes interfaces by which external applications may configure a cloud exchange to facilitate delivery of cloud services from cloud service providers according to techniques described in this disclosure.

FIG. 12 is a block diagram illustrating a programmable network platform that includes interfaces by which customers of a cloud exchange may facilitate delivery of cloud services from cloud service providers to sub-customers according to techniques described in this disclosure. Programmable network platform 1202 of FIG. 12 may represent programmable network platform 120 of FIG. 1. In this example, programmable network platform 1202 exposes a service API 1204 for service delivery and data access. The various examples of service interfaces described in FIGS. 1-2 for communicating with examples of programmable network platform 1202 may all represent examples of service API 1204. In some examples, CSPs 1206 may provide programmable network platform 1202 with a route-service mapping list that matches routes to respective services.

Service API 1204 includes, in this example, at least one third-party plugin 1208 developed by cloud service providers and executed by the programmable network platform 1202 to request and establish layer 3 cloud services from the cloud service providers. Plugin 1208 may represent any of third-party orchestration modules. The plugin 1208 may implement a common plugin interface for the programmable network platform 1202 and translate interface methods, fields, etc., to a cloud service provider interface for CSP orchestration. For example, programmable network platform 1202 may invoke plugin 1208 to request a service instance from a cloud service provider for the cloud exchange provider 1226 (e.g., a 60 GB data storage service). Plugin 1208 for the cloud service provider receives the request and invokes CSP orchestration system 1210 to allow the cloud service provider to orchestrate the instantiation of the requested service. CSP orchestration 1210 via plugin 1208 then returns connectivity information in the form of a "network handle" to the programmable network platform 1202. The network handle includes information by which the cloud exchange can connect to the instantiated, requested service. For example, the network handle may include a VxLAN or VLAN identifier, a layer 3 route or network address, tunnel information and/or cloud aggregate link information. The programmable network platform 1202 uses the network handle to configure edge network 1212 to connect to the instantiated, requested service, and to interconnect at least one customer network to the instantiated, requested service. Edge network 1212 further includes servers 1224A, 1224B (collectively, "servers 1224") that offer one or more compute/computing farms by which the edge network 1212 may offer services to customers/sub-customers 1226A, 1226B (collectively, "customers/sub-customers 1226") and/or apply services to service traffic for customers/sub-customers 1226. Servers 1224 may represent x86 or other real or general-purpose servers configured to apply and/or offer services to customers. Servers 1224 may also include special-purpose appliances or containers for applying services to service traffic between customers and cloud service providers 1206. Such services may include, e.g., network address translation, deep packet inspection, firewall, distributed denial of service mitigation, and other native services that may be applied by the cloud exchange edge network 1212 controlled by the cloud exchange provider 1226 and as configured by programmable network platform 1202.

Operations portal 1214 represents a platform manufactured by the cloud service provider, for use by cloud service provider technicians or operators, e.g., that invokes the service API 1204 of programmable network platform 1202. CSP orchestration system 1210 represents one or more systems developed by the cloud service providers and usable by the programmable network platform 1202 to request layer 3 services from the cloud service providers. API gateway 1216 offers a high-level API by which customer-developed platforms or a cloud service provider-developed customer portal may request services from the programmable network platform 1202. Additional details of the API gateway and high-level API are found in U.S. patent application Ser. No. 14/927,451, incorporated above.

PNP 1202 may receive information from portal customer 1218 indicating the services that customer 1218 has selected to receive via edge network 1212. PNP 1202 may store this information in a service delivery table that matches services and routes, along with customer selections. CSPs 1206 may provide information about services available from CSPs through CSP orchestration 1210 and service API 1204. Information from CSP orchestration 1210 may include the available services, as well as the performance and security specifications associated with the services, for example. PNP 1202 may determine which services to advertise routes to portal customer 1218 and how to advertise the services. Service API 1204 may provision APIs to API gateway 1216 for portal customers 1218. In some examples, a CSP may provide PNP 1202 with a list that maps the routes to respective services, such as via a portal, plugin, API gateway, or other interface to PNP 1202.

PNP 1202 may receive accounting information for portal customers 1218 from business systems 1220. For example, business systems 1220 may store billing information for customers or sub-customers, such as name, customer identifier, address, phone number, email, to name only a few examples. When PNP 1202 configures a service for a customer or sub-customer that includes a service charge, Business Systems 1220 may store such expense information. In this way, Business System 1220 may provide an accounting of services purchased by a customer or sub-customer and provide unified billing for such services.

PNP 1202 may receive asset tagging information (as described in FIG. 8) from an asset management system 1222. For example, the asset tagging information may identify a particular reseller asset and an associated portal customer 1218 authorized to access and/or purchase from the reseller asset. In this way, asset management system 1222 may identify which assets portal customers 1218 have access to reseller assets.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following examples.

What is claimed is:
1. A method comprising:
   receiving, by a programmable network platform and from a customer of a co-location facility, a request to enable a sub-customer of the customer to place orders for connections or services that use one or more assets assigned to the customer of the co-location facility, wherein the request comprises an indication of at least one permission for the sub-customer to place orders for connections or services that use the one or more assets assigned to the customer via the programmable network platform;
   configuring, by the programmable network platform based on the indication of the at least one permission, permissions for the one or more assets to enable the sub-customer of the customer to place orders for connections or services that use the one or more assets assigned to the customer of the co-location facility;

receiving, by the programmable network platform and from the sub-customer, a request to order a connection or service that uses at least one of the one or more assets;

configuring, by the programmable network platform, responsive to the request to order the connection or service and based on the permissions for the one or more assets assigned to the customer of the co-location facility, a virtual routing and forwarding (VRF) instance assigned to the sub-customer to enable the sub-customer to access the at least one of the one or more assets assigned to the customer of the co-location facility; and outputting, in response to configuring the VRF instance, by the programmable network platform, an indication of access by the sub-customer to the at least one of the one or more assets assigned to the customer.

2. The method of claim 1, wherein the customer is a reseller of access to the one or more assets of the co-location facility.

3. The method of claim 1, wherein configuring permissions for the one or more assets comprises configuring permissions for the sub-customer to view at least a port, a connection, and a service from the one or more assets.

4. The method of claim 1, wherein the one or more assets comprises a cabinet assigned to the customer of the co-location facility.

5. The method of claim 1, wherein the one or more assets comprises a port assigned to the customer of the co-location facility.

6. The method of claim 1, wherein outputting the indication of access by the sub-customer to the at least one of the one or more assets comprises outputting, by the programmable network platform, user interface data for display by a customer portal for the co-location facility, the user interface data indicating access by the sub-customer to the at least one of the one or more assets.

7. The method of claim 6, wherein the user interface data indicates the sub-customer is enabled to select a port for an interconnection for the customer.

8. The method of claim 1, further comprising:
assigning, by the programmable network platform, a first one or more ports and a second one or more ports to the customer,
wherein the one or more assets comprise the first one or more ports and do not comprise the second one or more ports.

9. The method of claim 1,
wherein an asset of the one or more assets is associated with an asset record stored to a database,
wherein configuring permissions for the one or more assets to enable the sub-customer of the customer to place orders for connections or services that use the one or more assets comprises:
modifying, by the programmable network platform, the asset record to tag the asset record with a sub-customer identifier for the sub-customer,
wherein outputting the indication of access by the sub-customer to the at least one of the one or more assets comprises determining, by the programmable network platform based on the modified asset record, the sub-customer has permission to access the asset, and
wherein assigning the one or more assets comprises tagging an identifier for the one or more assets with an identifier for the sub-customer in a database.

10. The method of claim 1, wherein the sub-customer comprises a first-sub-customer, wherein the VRF instance comprises a first VRF instance, the method further comprising:

receiving, by the programmable network platform and from the customer of the co-location facility, a request to enable a second sub-customer of the customer to place orders for connections or services that use the one or more assets assigned to the customer of the co-location facility, wherein the request comprises an indication of at least one permission for the second sub-customer to place orders for connections or services that use the one or more assets assigned to the customer via the programmable network platform;

configuring, by the programmable network platform based on the indication of the at least one permission, permissions for the one or more assets to enable the second sub-customer of the customer to place orders for connections or services that use the one or more assets assigned to the customer of the co-location facility;

receiving, by the programmable network platform and from the second sub-customer, a request to order a connection or service that uses at least one of the one or more assets;

configuring a second VRF instance assigned to the second sub-customer to enable the second sub-customer to access the at least one of the one or more assets assigned to the customer of the co-location facility, wherein the first VRF instance and the second VRF instance enable differentiation and isolation between the first sub-customer and the second sub-customer; and outputting, in response to configuring the second VRF instance, by the programmable network platform, an indication of access by the second sub-customer to the at least one of the one or more assets assigned to the customer.

11. A network data center comprising:
a programmable network platform comprising one or more hardware-based processors configured to:
receive, from a customer of a co-location facility, a request to enable a sub-customer of the customer to place orders for connections or services that use one or more assets assigned to the customer of the co-location facility, wherein the request comprises an indication of at least one permission for the sub-customer to place orders for connections or services that use the one or more assets assigned to the customer via the programmable network platform;

configure, based on the indication of the at least one permission, permissions for the one or more assets to enable the sub-customer of the customer to place orders for connections or services that use the one or more assets assigned to the customer of the co-location facility;

receive, from the sub-customer, a request to order a connection or service that uses at least one of the one or more assets;

configure, in response to the request to order the connection or service and based on the permissions for the one or more assets assigned to the customer of the co-location facility, a virtual routing and forwarding (VRF) instance assigned to the sub-customer to enable the sub-customer to access the at least one of the one or more assets assigned to the customer of the co-location facility; and
output, in response to configuring the VRF instance, by the programmable network platform, an indication of access by the sub-customer to the at least one of the one or more assets assigned to the customer.

12. The network data center of claim 11, wherein, to configure permissions for the one or more assets, the one or more hardware-based processors are further configured to:
configure permissions for the sub-customer to view at least a port, a connection, and a service from the one or more assets.

13. The network data center of claim 11, wherein the one or more assets comprises a cabinet assigned to the customer of the co-location facility.

14. The network data center of claim 11, wherein the one or more assets comprises a port assigned to the customer of the co-location facility.

15. The network data center of claim 11, wherein outputting the indication of access by the sub-customer to the at least one of the one or more assets comprises outputting, by the programmable network platform, user interface data for display by a customer portal for the co-location facility, the user interface data indicating access by the sub-customer to the at least one of the one or more assets.

16. The network data center of claim 15, wherein the user interface data indicates the sub-customer is enabled to select a port for an interconnection for the customer.

17. The network data center of claim 11, wherein the one or more hardware-based processors is further configured to:
assign a first one or more ports and a second one or more ports to the customer,
wherein the one or more assets comprise the first one or more ports and do not comprise the second one or more ports.

18. The network data center of claim 11,
wherein an asset of the one or more assets is associated with an asset record stored to a database,
wherein configuring permissions for the one or more assets to enable the sub-customer of the customer to place orders for connections or services that use the one or more assets comprises:
modifying, by the programmable network platform, the asset record to tag the asset record with a sub-customer identifier for the sub-customer,
wherein outputting the indication of access by the sub-customer to the at least one of the one or more assets comprises determining, by the programming network platform based on the modified asset record, the sub-customer has permission to access the asset, and
wherein assigning the one or more assets comprises tagging an identifier for the one or more assets with an identifier for the sub-customer in a database.

19. The network data center of claim 11,
wherein the sub-customer comprises a first-sub-customer, wherein the VRF instance comprises a first VRF instance assigned to the first sub-customer, wherein the one or more hardware-based processors are further configured to:
receive, from the customer of the co-location facility, a request to enable a second sub-customer of the customer to place orders for connections or services that use the one or more assets assigned to the customer of the co-location facility, wherein the request comprises an indication of at least one permission for the second sub-customer to place orders for connections or services that use the one or more assets assigned to the customer via the programmable network platform;
configure, based on the indication of the at least one permission, permissions for the one or more assets to enable the second sub-customer of the customer to place orders for connections or services that use the one or more assets assigned to the customer of the co-location facility;
receive, from the second sub-customer, a request to order a connection or service that uses at least one of the one or more assets;
configure a second VRF instance assigned to the second sub-customer to enable the second sub-customer to access the at least one of the one or more assets assigned to the customer of the co-location facility, wherein the first VRF instance and the second VRF instance enable differentiation and isolation between the first sub-customer and the second sub-customer; and
output, in response to configuring the second VRF instance, an indication of access by the second sub-customer to the at least one of the one or more assets assigned to the customer.

20. A non-transitory computer-readable storage medium having stored thereon instructions that, when executed, cause a processor to:
receive, from a customer of a co-location facility, a request to enable a sub-customer of the customer to place orders for connections or services that use one or more assets assigned to the customer of the co-location facility, wherein the request comprises an indication of at least one permission for the sub-customer to place orders for connections or services that use the one or more assets assigned to the customer via a programmable network platform;
configure, based on the indication of the at least one permission, permissions for the one or more assets to enable the sub-customer of the customer to place orders for connections or services that use the one or more assets assigned to the customer of the co-location facility;
receive, from the sub-customer, a request to order a connection or service that uses at least one of the one or more assets;
configure, in response to the request to order the connection or service and based on the permissions for the one or more assets assigned to the customer of the co-location facility, a virtual routing and forwarding (VRF) instance assigned to the sub-customer to enable the sub-customer to access the at least one of the one or more assets assigned to the customer of the co-location facility; and
output, in response to configuring the VRF instance, by the programmable network platform, an indication of access by the sub-customer to the at least one of the one or more assets assigned to the customer.

* * * * *